United States Patent [19]

Ogata et al.

[11] Patent Number: 5,471,355
[45] Date of Patent: Nov. 28, 1995

[54] MAGNETIC HEAD AND A DIGITAL RECORDING MAGNETIC HEAD

[75] Inventors: Seiichi Ogata, Miyagi; Moriyuki Kawaguchi, Tokyo; Keiji Kanota, Kanagawa; Yukio Kubota, Kanagawa; Heikichi Sato, Miyagi; Iwao Abe, Kanagawa, all of Japan

[73] Assignee: Sony Corporation, Tokyo, Japan

[21] Appl. No.: 216,599

[22] Filed: Mar. 22, 1994

Related U.S. Application Data

[63] Continuation of Ser. No. 852,729, Mar. 17, 1992, abandoned.

[30] Foreign Application Priority Data

| Mar. 29, 1991 | [JP] | Japan | 3-091543 |
| Apr. 4, 1991 | [JP] | Japan | 3-097885 |
| Nov. 11, 1991 | [JP] | Japan | 3-322500 |

[51] Int. Cl.⁶ ............................ G11B 5/02; G11B 5/027; G11B 5/127
[52] U.S. Cl. ............................ 360/84; 360/104; 360/125; 360/19.1; 360/21
[58] Field of Search .................... 360/10.2, 10.3, 360/32, 48, 53, 64, 77.13–77.15, 84, 85, 104, 130.22–130.24, 19.1, 9.1, 10.1

[56] References Cited

U.S. PATENT DOCUMENTS

| 4,758,911 | 7/1988 | Nakano et al. | 360/64 |
| 4,772,967 | 9/1988 | Okuda et al. | 360/84 |
| 4,873,589 | 10/1989 | Inazawa et al. | 360/32 |
| 5,012,459 | 4/1991 | Odaka et al. | 360/48 |
| 5,079,658 | 1/1992 | Sakai et al. | 360/84 |
| 5,095,394 | 3/1992 | Yanagihara | 360/77.14 |
| 5,121,259 | 6/1992 | Yamashita | 360/19.1 |
| 5,124,853 | 6/1992 | Kashida et al. | 360/77.14 |
| 5,140,473 | 8/1992 | Murakami | 360/64 |
| 5,233,478 | 8/1993 | Karota | 360/21 |

FOREIGN PATENT DOCUMENTS

| 4002971A1 | 8/1990 | Germany. | |
| 1-7375 | 1/1989 | Japan | 360/84 |

OTHER PUBLICATIONS

Patent Abstracts of Japan vol. 13, No. 222 (P-8766) 24 May 1989 6 JP-A-10 35 718 (Canon Inc.) & Feb. 1989.
Patent Abstracts of Japan, vol. 12, No. 71 (P-673) 5 Mar. 1988 & JP-A-62 209 711 (Mitsubishi Electric Corp.) 14 Sep. 1987.
Patent Abstracts of Japan, vol. 14, No. 500 (P-1125) 31 Oct. 1990 & JP-A-22 06 014 (Matsushita Electric Ind. Co.) 15 Aug. 1990.

Primary Examiner—A. J. Heinz
Assistant Examiner—Jefferson Evans
Attorney, Agent, or Firm—William S. Frommer; Alvin Sinderbrand

[57] ABSTRACT

A magnetic head comprises a head base (56), and a pair of magnetic head chips (57, 58) of different azimuth angles ($\theta_1$, $\theta_2$) disposed on the head base (56). The pair of magnetic head chips (57, 58) are disposed in a stepped arrangement with respect to the direction of arrangement of tracks on a magnetic recording medium with a step (DA) substantially equal to the pitch (P) of tracks on the magnetic recording medium. The gap distance (GL) between the magnetic gaps of the magnetic head chips (57, 58) is shorter than the sum of the step (D) between adjacent tracks and the length (L) of interblock gap regions between video signal regions and audio signal regions arranged along the direction of the movement of the magnetic head. The magnetic head permits satisfactory audio signal after-recording and extended recording and reproducing of digital video signals on the magnetic recording medium even if the magnetic recording medium is a narrow magnetic tape of 8 mm or less in width.

20 Claims, 27 Drawing Sheets

F I G. 31
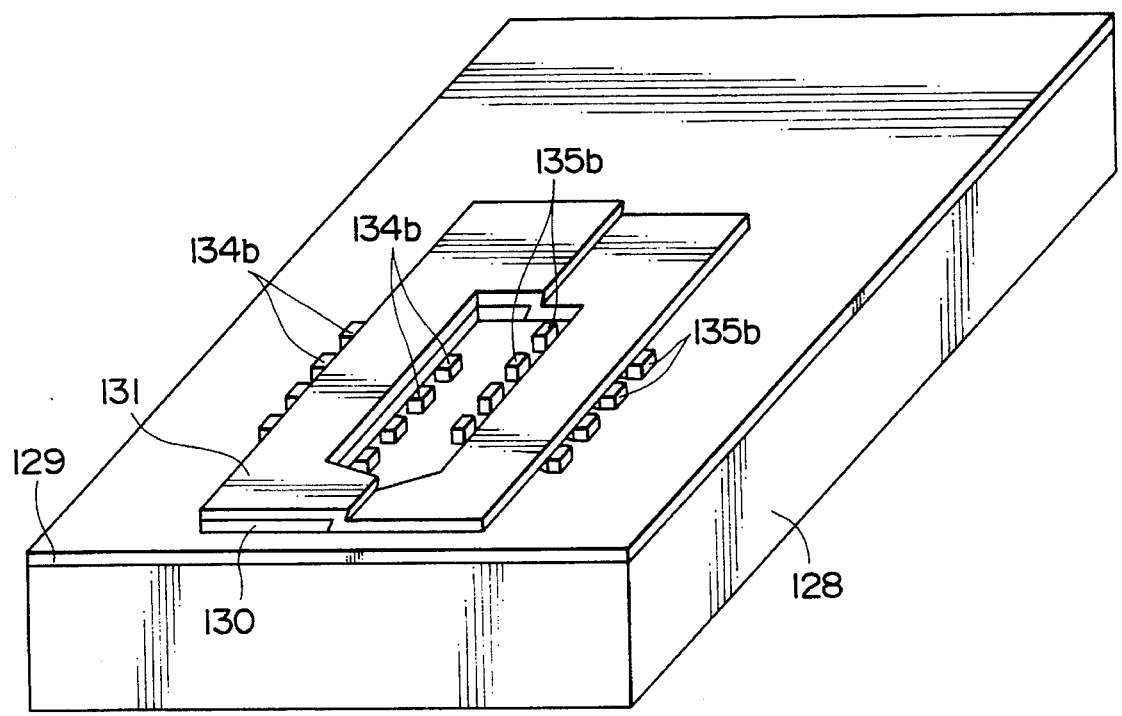

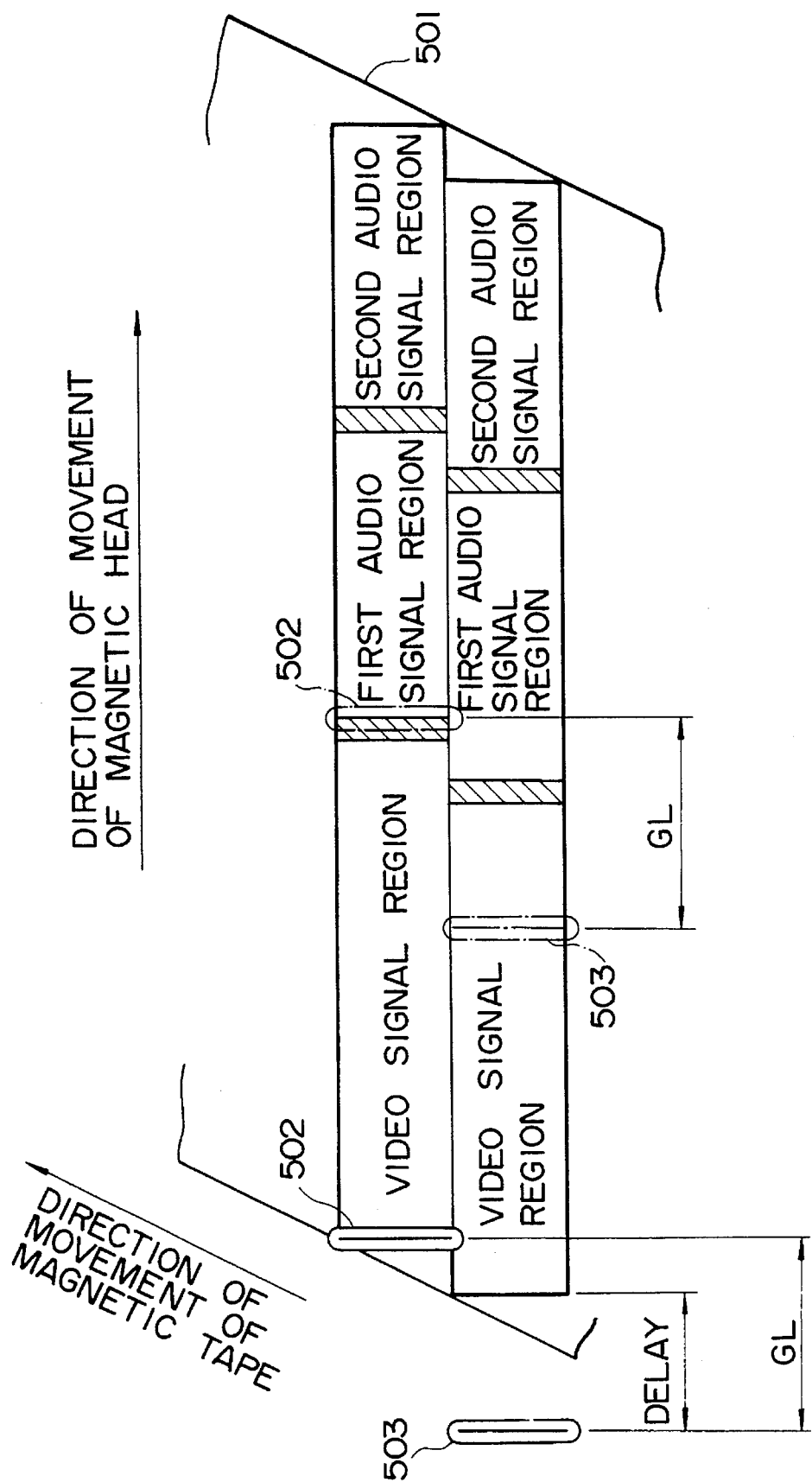

MAGNETIC HEAD AND A DIGITAL RECORDING MAGNETIC HEAD

This application is a continuation of application Ser. No. 07/852,729, filed Mar. 17, 1992, now abandoned.

BACKGROUND OF THE INVENTION

1. Field of the Invention

The present invention relates to magnetic heads and more particularly to digital recording magnetic heads for use on digital video tape recorders and the like.

2. Description of the Prior Art

A digital recording/reproducing apparatus, which converts video signals into corresponding digital signals, records the digital signals on a magnetic tape and reproduces the digital signals recorded on a magnetic tape, is known. In general, an apparatus of this type distributes digital signals into a plurality of channels, and records or reproduces the digital signals of the respective channels by individual magnetic heads. Such a digital recording/reproducing apparatus uses, for example, two magnetic heads mounted on a rotary drum in diametrically opposite positions for recording and reproducing. In recording signals by such a digital recording/reproducing apparatus, it may occur that signals recorded by the preceding magnetic head are erased by the succeeding magnetic head due to the eccentric rotation of the rotary drum. Accordingly, the ratio of erased signals to remaining signals increases, so that the reproducing output of the digital recording/reproducing apparatus is not sufficiently high and the bit error rate is greatly increased.

To solve such problems, a recording/reproducing method uses simultaneously two magnetic heads combined in an integral magnetic head unit and disposed respectively at different azimuth angles on a rotary drum for recording/reproducing operations. FIG. 34 shows a recording format for recording signals on a magnetic tape 501 by such magnetic heads combined in an integral unit. The signal is recorded at a fixed position on each track on the magnetic tape 501 to extend the recording time of the magnetic tape 501. Accordingly, a signal to be recorded by the succeeding magnetic head 503 is supplied to the succeeding magnetic head 503 with a delay relative to a signal to be recorded by the preceding magnetic head 502, which delay corresponds to a distance obtained by subtracting a step between tracks from the gap distance GL.

When this digital recording/reproducing apparatus is used as a video tape recorder (VTR), a video signal and an audio signal are recorded in separate recording regions. In recording a video signal and an audio signal in such a mode, the video signal and the audio signal must be recorded separately by a so-called after-recording method in which the audio signal is recorded after the video signal.

Because of crosstalk, it is difficult to use only one of the two magnetic heads 502 and 503 combined in an integral magnetic head unit. If an audio signal is recorded in an after-recording mode to obviate crosstalk, the succeeding magnetic head 503 remains in a video signal recording region as indicated by a broken line (FIG. 34) when the preceding magnetic head 502 is at the front end of an audio signal recording region to start recording the audio signal. Therefore, if the preceding magnetic head 502 starts recording the audio signal at this time, some recording signal flows through the succeeding magnetic head 503, which may adversely affect the video signal. Thus, after-recording is virtually impossible. When the two magnetic heads 502 and 503 are combined in an integral magnetic head unit for simultaneous recording and reproducing to record signals on and to reproduce signals from a magnetic tape, a positional relation between the two magnetic heads 502 and 503 is very important.

SUMMARY OF THE INVENTION

Accordingly, it is an object of the present invention to provide a magnetic head and a digital magnetic recording head capable of recording and reproducing digital video signals with a high recording density on a narrow magnetic tape so as to extend the recording time.

According to a first aspect of the present invention, in a digital video tape recorder that records video and audio signals on a magnetic tape by means of a digital recording magnetic head that moves relative to said tape in a scanning direction to form successive slant tracks thereon while the tape is advanced so that adjacent tracks are displaced with respect to each other in said scanning direction by a step distance and are displaced with respect to each other in a transverse direction perpendicular to the scanning direction at a pitch distance, each track having a video signal region and an audio signal region which define therebetween an interblock gap, the magnetic head comprises a head base, and a pair of magnetic head chips disposed at different azimuth angles and each having a respective magnetic gap on the head base, the pair of magnetic head chips being displaced with respect to each other in the transverse direction by a distance corresponding to the pitch distance and the respective magnetic gaps being displaced with respect to each other in the scanning direction by a distance that is less than the sum of the length of the interblock gap and the step distance.

According to a second aspect of the present invention in a digital video tape recorder that records video and audio signals on a magnetic tape by means of a digital recording magnetic head that moves relative to said tape in a scanning direction to form successive slant tracks thereon while the tape is advanced so that adjacent tracks are displaced with respect to each other in said scanning direction by a step distance, and are displaced with respect to each other in a transverse direction perpendicular to the scanning direction at a pitch distance, each track having a video signal region and an audio signal region which define therebetween an interblock gap, there are provided means for separating input digital video signals into data blocks each consisting of a plurality of picture element data, means for compression coding the data blocks and means for channel coding the compression-coded data and supplying the resulting compression-coded data to said digital recording magnetic head which comprises a head base, and a pair of magnetic head chips disposed at different azimuth angles on the head base and each having a respective magnetic gap, the pair of magnetic head chips being displaced with respect to each other in transverse direction by a distance corresponding to the pitch distance and the respective magnetic gaps being displaced with respect to each other in the scanning direction by a distance that is less than the sum of the length of the interblock gap and the step distance.

According to the third aspect of the present invention, in a digital video tape recorder that records video and audio signals on a magnetic tape by means of a digital recording magnetic head that moves relative to said tape in a scanning direction to form successive slant tracks thereon while the tape is advanced so that adjacent tracks are displaced with respect to each other in said scanning direction by a step distance, and are displaced with respect to each other in a transverse direction perpendicular to the scanning direction at a pitch distance, each track having a video signal region and an audio signal region which define therebetween an interblock gap, the magnetic head comprises a pair of magnetic head gaps formed in different azimuth angles, the pair of magnetic gaps being displaced with respect to each other in the transverse direction by a distance substantially equal to the pitch distance being displaced with respect to each other in the scanning direction by a distance that is less than the sum of the length of the interblock gap and the step distance.

According to the fourth aspect of the present invention, in a digital video tape recorder that records video and audio signals on a magnetic tape by means of a digital recording magnetic head that moves relative to said tape in a scanning direction to form successive slant tracks thereon while the tape is advanced so that adjacent tracks are displaced with respect to each other in said scanning direction by a step distance, and are displaced with respect to each other in a transverse direction perpendicular to the scanning direction at a pitch distance, each track having a video signal region and an audio signal region which define therebetween an interblock gap, there are provided means for separating input digital video signals into data blocks each consisting of a plurality of picture element data, means for compression coding the data blocks and means for channel-coding the compression-coded data and supplying the resulting channel-coded data to the digital recording magnetic head which comprises a pair of magnetic gaps formed at different azimuth angles, the magnetic gaps being displaced with respect to each other in the transverse direction by a distance substantially equal to the pitch distance and being displaced with respect to each other in the scanning direction by a distance that is less than the sum of the length of the interblock gap and the step distance.

In the magnetic head of the first aspect of the present invention, the distance between the magnetic head gaps of the pair of magnetic head chips disposed on the head base is shorter than the sum of the step between the tracks and the length of interblock gap regions between video signal regions and audio signal regions on the magnetic recording medium. Therefore, the magnetic head chip is in the interblock gap region when the magnetic head gap of the magnetic head chip is at the front end of the audio signal region, so that the preceding magnetic head chip is able to function for satisfying after-recording without disturbing the picture.

In the digital magnetic recording head of the second aspect of the present invention, the input signals are compressed so that the reproduced signals are not distorted greatly and the channel-coded data is recorded on the magnetic recording medium, and the pair of magnetic head chips mounted on the head base function simultaneously for recording and reproducing. Therefore, extended recording and reproducing of digital video signals at a small bit error rate is possible even if the digital video signals are recorded on and reproduced from a narrow magnetic recording medium on tracks with a track width of 8 µm or less by a recording signal having a wavelength of 0.5 µm and a bit density of $5 \times 10^5$ bits/mm².

In the magnetic head of the third aspect of the present invention, the distance between the pair of magnetic head gaps is shorter than the sum of the step between the tracks and the length of the interblock gap regions between video signal regions and audio signal regions on a magnetic recording medium. Therefore, the succeeding magnetic head gap is in the interblock gap region when the preceding magnetic head gap is at the front end of an audio signal region. Accordingly, the preceding magnetic head gap is able to function for satisfactory after-recording without disturbing the picture.

In the digital magnetic recording head of the fourth embodiment according to the present invention, input signals are compressed so that the reproduced signals are not distorted greatly, channel-coded data is recorded on a magnetic recording medium, and the pair of magnetic head gaps of the magnetic head function simultaneously for recording and reproducing. Therefore, extended recording and reproducing of digital video signals at a small bit error rate is possible even if the digital video signals are recorded on and reproduced from a narrow magnetic recording medium on tracks having a track width of 8 µm or less by a recording signal having a wavelength of 0.5 µm and a bit density of $5 \times 10^5$.

BRIEF DESCRIPTION OF THE DRAWINGS

The above and other objects, features and advantages of the present invention will become more apparent from the following description taken in connection with the accompanying drawings, in which:

FIG. 31 is a perspective view that depicts a side conductive thin film forming process in the method of fabricating the magnetic head unit of FIG. 26;

FIG. 34 is a diagram showing the format of a magnetic tape on which digital video signals and audio signals are to be recorded by a conventional magnetic head.

DETAILED DESCRIPTION OF THE PREFERRED EMBODIMENTS

First Embodiment

A digital recording magnetic head according to the first embodiment according to the present invention corresponds to those in the first and second aspects as discussed above.

A digital recording magnetic head according to the first embodiment is provided with a pair of magnetic head chips of different azimuth angles, compresses recording signals without entailing significant distortion in reproduced signals and permits extended digital video signal recording and reproducing on tracks of 8 µm or less in width on a narrow magnetic tape of 8 mm or less in width at a recording wavelength of 0.5 µm and a high bit density of $5 \times 10^5$ bits/mm$^2$.

A method of compressing signals without entailing a large distortion in reproduced signals will be described. This method separates input digital video signals into data blocks each consisting of a plurality of picture element data, compresses and encodes the data blocks for compression coding, channel-codes the compression-coded data, and records the channel-coded data on a magnetic tape by the digital recording magnetic head of the first embodiment mounted on a rotary drum. A recording circuit and a reproducing circuit included in a signal processing unit will be described separately.

Figure 1:
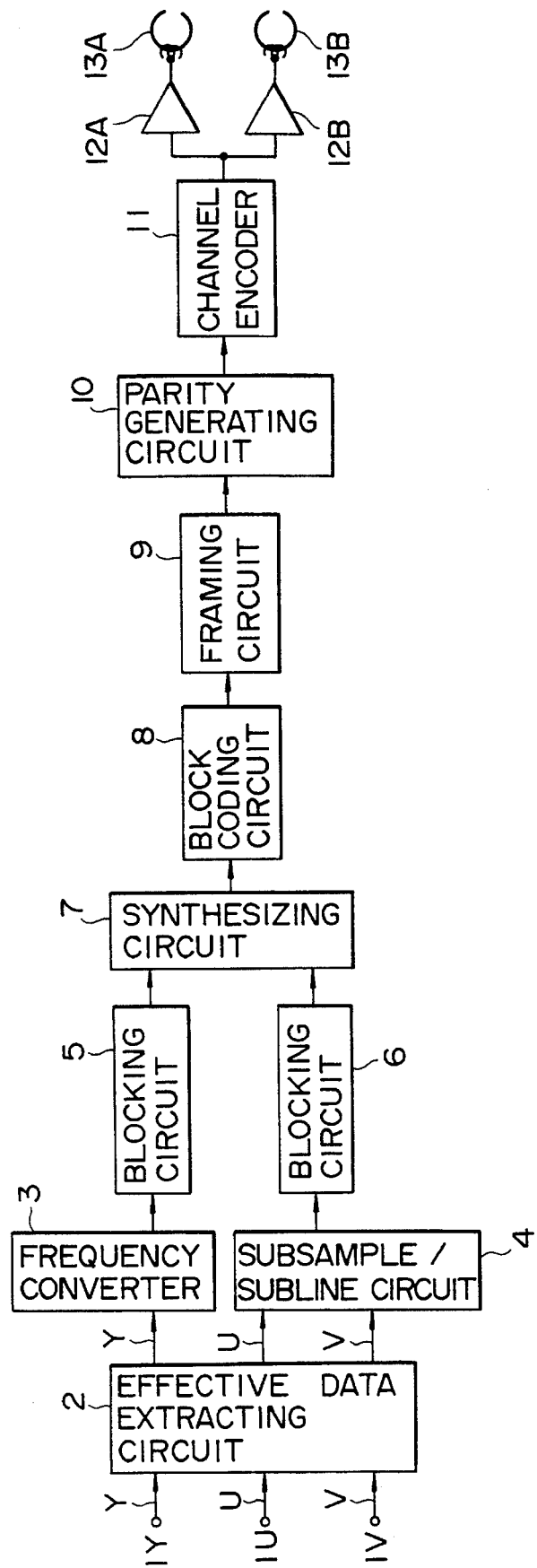
FIG. 1 is a block diagram of a recording circuit included in a signal processing unit for compressing digital video data.

Referring to FIG. 1 digital luminance signals Y, and digital color difference signals U and V, all extracted from three color signals R, G and B produced by, for example, a color video camera, are applied respectively to input terminals 1Y, 1U and 1V. The clock rates of the signals Y, U and V are equal to the frequencies of the component signals of the D1 format. Sampling frequencies are 13.5 MHz and 6.75 MHz, and each sample is represented by eight bits. Therefore, the quantity of data of the signals applied to input terminals 1Y, 1U and 1V is about 216 Mbps. The quantity of data of the signals is compressed to about 167 Mbps by removing data in blanking periods among the signals and extracting only the data in effective regions by an effective data extracting circuit 2.

The luminance signals Y among the output signals of effective data extracting circuit 2 are given to frequency a converter 3. The frequency converter 3 converts the sampling frequency of 13.5 MHz into a frequency equal to ¾ of 13.5 MHz. The frequency converter 3 employs, for example, a thinning filter to prevent convolutional distortion. The output signal of the frequency converter 3 is given to a blocking circuit 5. The blocking circuit 5 converts the sequence of luminance data into a sequence of blocks.

Figure 3:
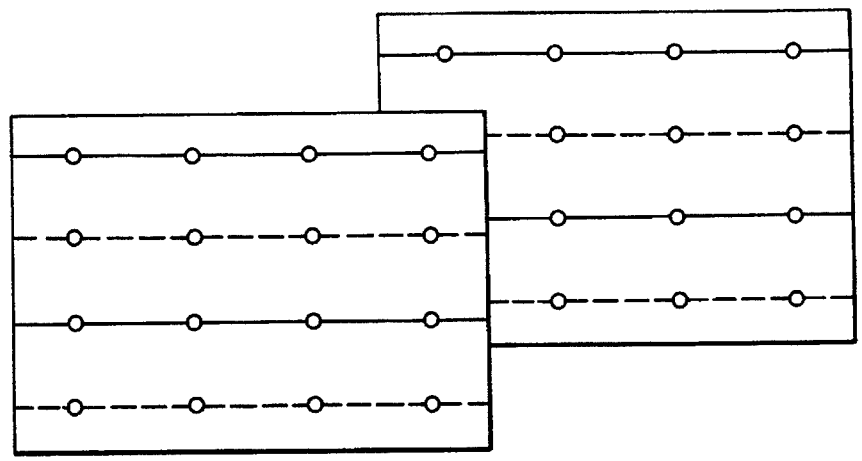
FIG. 3 is a diagram of blocks for block-coding.

FIG. 3 shows the structure of a three-dimensional block to be coded. A plurality of unit blocks each 4-line×4-picture-element×2-frame are formed by dividing a screen spreading over, for example, two frames. In FIG. 3, lines of odd fields are represented by continuous lines, and lines of even fields are represented by broken lines.

Figure 4:
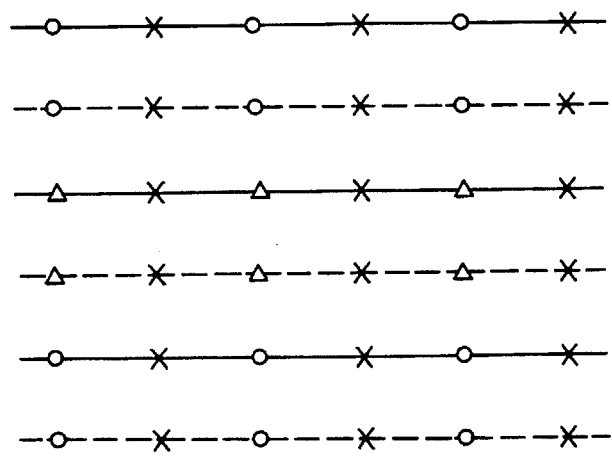
FIG. 4 is a diagram depicting subsampling and sublines.

Two color difference signals U and Y among the output signals of the effective data extracting circuit 2 are given to a subsampling/subline circuit 4. The subsampling/subline circuit 4 changes the sampling frequency of 6.75 MHz into a sampling frequency of ½ of 6.75 MHz. The two digital color difference signals are selected for lines and data of one channel is produced. The subsampling/subline circuit 4 provides digital signals in line sequence. FIG. 4 shows the dot construction of the signals processed by the subsampling/subline circuit 4, in which blank circles represent subsampling dots of the first color difference signal U, blank triangles represent sampling dots of the second color difference signal V, and crosses represent dots removed by subsampling.

The line sequence output signals of the subsampling/subline circuit 4 are given to a blocking circuit 6. The blocking circuit 6, similarly to the blocking circuit 5, converts the color difference data to the scanning sequence of television signals into data in block sequence. The blocking circuit 6 converts the color difference data into those of a 4-line×4-dot×2-frame structure. The output signals of the blocking circuits 5 and 6 are given to a synthesizing circuit 7.

The synthesizing circuit 7 converts the block sequence luminescence signals and color difference signals into data of one channel and gives the same to a block coding circuit 8. The block coding circuit 8 is a coding circuit suitable for the dynamic range of each block (hereinafter referred to as "ADRC") or a discrete cosine transform circuit (hereinafter referred to as a "DCT circuit"). The output signal of the block coding circuit 8 is given to a framing circuit 9. The framing circuit 9 converts the input signal into the data of frame structure. In the framing circuit 9, the clock of the picture element system is changed to that of the recording system.

The output signal of the framing circuit 9 is given to a parity generating circuit 10 for generating a parity for an error correction code. The output signal of the parity generating circuit 10 is given to a channel encoder 11 for channel coding to decrease the low region of the recording data. The output signal of the channel encoder 11 is applied through recording amplifiers 12A and 12B and a rotary transformer, not shown, to a pair of magnetic head chips 13A and 13B to record the output signal of the channel encoder 11 on a magnetic tape. Video signals and audio signals are compressed and coded separately and given to channel encoder 11.

The foregoing signal processing procedure extracts only the data in the effective scanning period among the input data of 216 Mbps to provide recording data of 31.56 Mbps.

The reproducing circuit of the signal processing unit will be described hereinafter with reference to FIG. 2.

Figure 2:
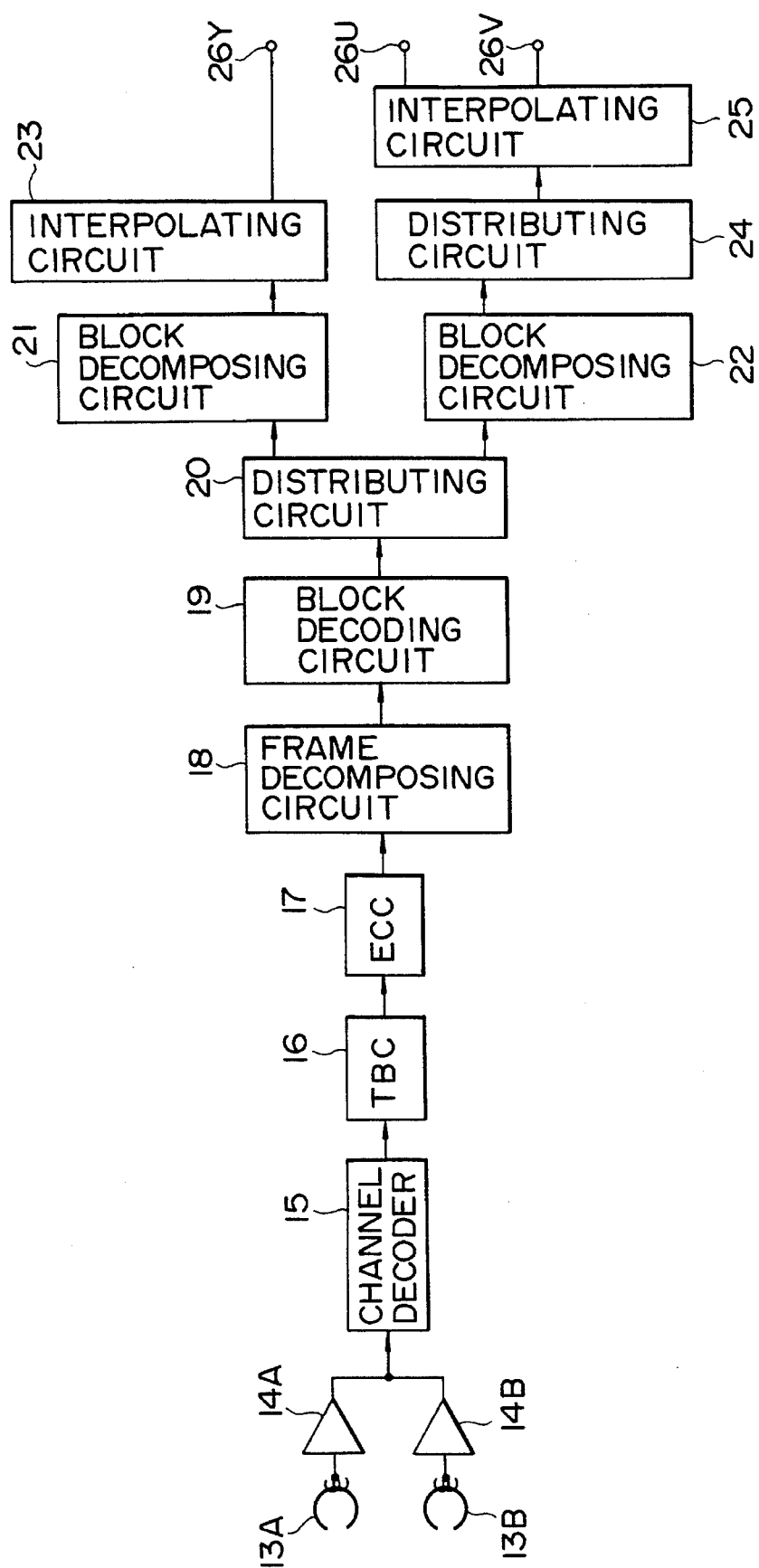
FIG. 2 is a block diagram of a reproducing circuit included in the signal processing unit.

Referring to FIG. 2, reproduced data read by the magnetic head chips 13A and 13B are transmitted through a rotary transformer (not shown) and reproducing amplifiers 14A and 14B to a channel decoder 15. The channel decoder 15 decodes the reproduced data by channel-decoding. The output signal of the channel decoder 15 is given to a TBC (time base corrector) 16. The TBC 16 removes time base errors from the reproduced data, and gives the reproduced data to an ECC 17 for error correction and error modification using error correction code. The output signal of the ECC 17 is given to a frame decomposing circuit 18.

The frame decomposing circuit 18 separates the components of the block-coded data and changes the clock of the recording system to the clock of the picture element system. The data decomposed by frame decomposing circuit 18 is given to a block-decoding circuit 20. The block-decoding circuit 19 decodes recovered data corresponding to original data for each block, and gives decoded data to a distributing circuit 10. The distributing circuit 20 decomposes the decoded data into luminance signals and color difference signals, and gives the luminance signals and the color difference signals respectively to block decomposing circuits 21 and 22. The block decomposing circuits 21 and 22 converts the decoded data from block sequence into decoded data in raster scanning sequence. The function of the block decomposing circuits 21 and 22 is the opposite of the function of blocking circuits 5 and 6 of the recording circuit.

A decoded luminance signal produced by the block decomposing circuit 21 is given to an interpolating filter 23. The interpolating filter 23 changes the sampling rate of the luminance signal from 3 fs to 4 fs (=13.5 MHz), and applies a digital luminance signal Y to an output terminal 26Y.

The block decomposing circuit 22 gives the digital color difference signals to a distributing circuit 24. The distributing circuit 24 sorts the line sequence digital color difference signals U and V into digital color difference signals U and V and gives the same to an interpolating circuit 25 for interpolation. The interpolating circuit 25 interpolates the data of the extracted lines and picture elements by using the recovered picture element data and gives digital color difference signals U and V of a sampling rate of 2 fs to output terminals 26U and 26V.

The block coding circuit 8 is preferably an ADRC (adaptive dynamic range coding) circuit which determines the maximum MAX and the minimum MIN of the plurality of picture element data included in each block, determines the dynamic range DR of the block, and carries out a coding operation according to the dynamic range DR for requantization using a bits' number smaller than the number of bits of the original picture element data. Alternatively, block coding circuit 8 may be a circuit that converts the picture element data of each block by DCT (discrete cosine transform) into coefficient data, quantizes the coefficient data obtained by DCT, and subjects the quantized data to Huffman run length coding for compression-coding.

An ADRC circuit which prevents deterioration of picture quality even if signals are recorded in a multidubbing mode will be described with reference to FIG. 5.

Figure 5:
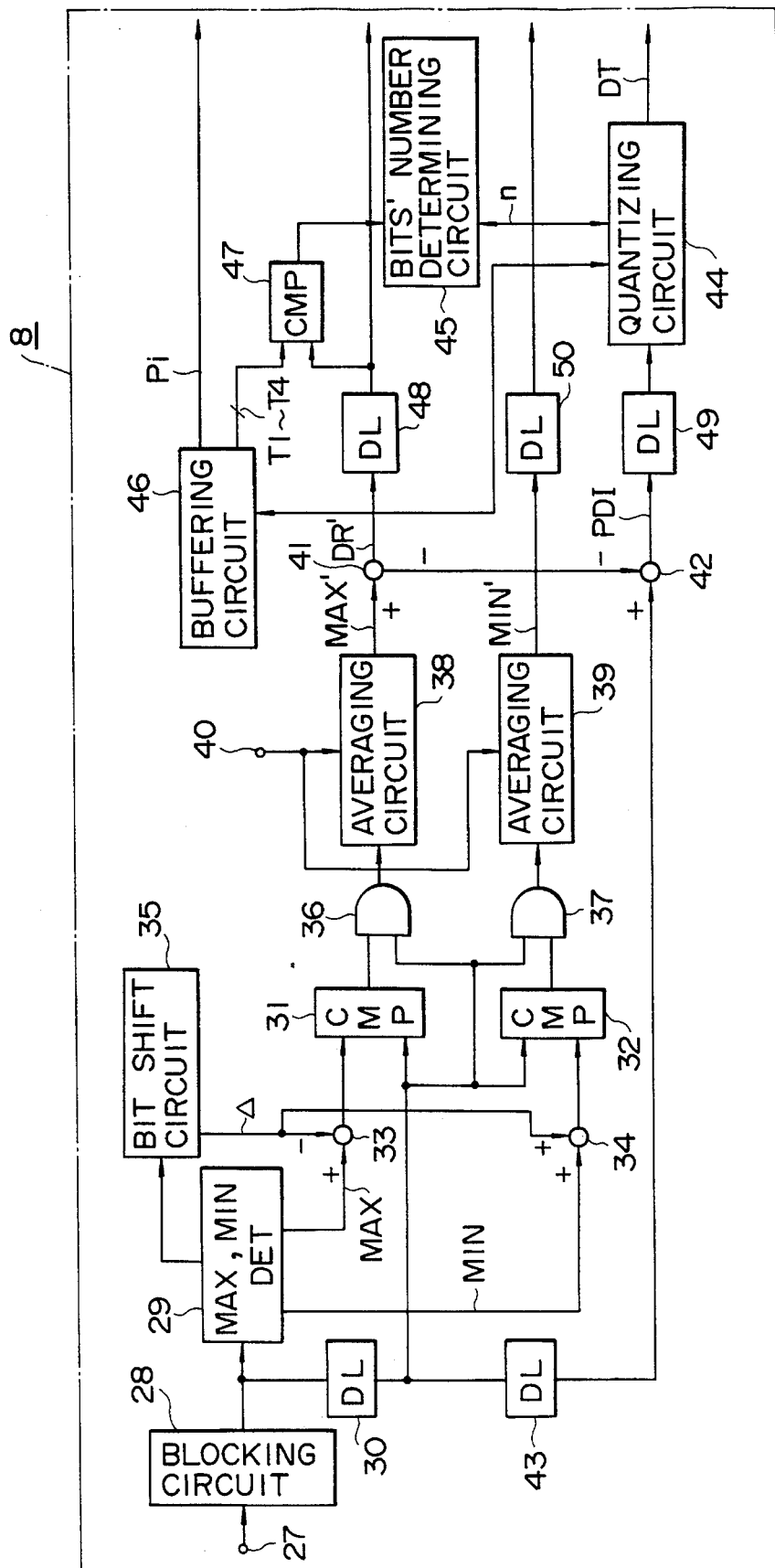
FIG. 5 is a block diagram of a block-coding circuit.

Referring to FIG. 5, the synthesizing circuit 7 (FIG. 1) applies a digital video signal (or a digital color difference signal) quantized by eight bits for each sample through an input terminal 27 to a blocking circuit 28. The blocking circuit 28 gives blocked data to a maximum/minimum detecting circuit 29 and a delay circuit 30. The maximum/minimum detecting circuit 29 detects the maximum MAX and the minimum MIN in each block. The delay circuit 30 delays receiving input data for the time required to detect the maximum MAX and the minimum MIN. Delay circuit 30 gives picture element data to comparators 31 and 32.

The maximum MAX and the minimum MIN detected by the maximum/minimum detecting circuit 29 are given respectively to a subtracter 33 and an adder 34. A bit shift circuit 35 applies a quantizing step width $\Delta$ of 1/16 DR for nonedgematching quantization of 4-bit fixed length to the subtracter 33 and the adder 34. The bit shift circuit 35 shifts the dynamic range DR by four bits for division by 16. The subtracter 33 provides a threshold of (MAX−$\Delta$) and the adder 34 provides a threshold of (MIN+$\Delta$). The thresholds provided by the subtracter 33 and the adder 34 are given to the comparators 31 and 32, respectively. The quantizing step width $\Delta$ may be replaced by a fixed value corresponding to a noise level.

The output signal of the comparator 31 is applied to an AND gate 36 and the output signal of the comparator 32 is applied to an AND gate 37. The delay circuit 30 applies the input data to the AND gates 36 and 37. The output signal of the comparator 31 is HIGH when the input data is greater than the threshold. Accordingly, picture element data within a maximum level range of MAX to (MAX−$\Delta$) among the input data appear at the output terminal of the AND gate 36. The output signal of comparator 32 is LOW when the input data is smaller than the threshold. Accordingly, the picture element data in a minimum level range of MIN to (MIN+$\Delta$) among the input data appear at the output terminal of the AND gate 37.

The output signal of the AND gate 36 is given to an averaging circuit 38 and the output signal of the AND gate 37 is given to an averaging circuit 39. The averaging circuits 38 and 39 calculate the respective averages of the blocks. A blocking period reset signal is applied through a terminal 40 to the averaging circuits 38 and 39. The averaging circuit 38 provides the average MAX' of the picture element data in the maximum level range of MAX to (MAX−$\Delta$). The averaging circuit 39 provides the average MIN' of the picture element data in the minimum level range of MIN to (MIN+Δ). A subtracter 41 subtracts the average MIN' from the average MAX' to provide a dynamic range of DR'.

A subtracter 42 subtracts the average MIN' from the input data given thereto through the delay circuit 43 to eliminate the minimum value from the input data and provides data PD1. The data PD1 and the corrected dynamic range DR' are given to a quantizing circuit 44. The quantizing circuit 44 employed in this embodiment is a variable-length ADRC for edge-matching quantization, in which the number of bits allocated for quantization is 0 (code signal is not transferred), 1, 2, 3 or 4. The number n of bits to be allocated to a block is determined for each block by a bits' number determining circuit 45 and the number n of allocated bits is given to the quantizing circuit 44.

The Variable-length ADRC allocates smaller numbers of bits to blocks of smaller dynamic ranges DR' and allocates larger number of bits to blocks of larger dynamic ranges DR' for efficient coding. No code signal is transferred and only data of a dynamic range DR' is transferred for blocks having a dynamic range DR' meeting: DR' <T1, n=1 for blocks of a dynamic range DR' meeting: T1≦DR' <T2, n=2 for blocks of a dynamic range DR' meeting: T2≦DR' <T3, n=3 for blocks of a dynamic range DR' meeting: T3≦DR' <T4, and n=4 for blocks of a dynamicrange DR' meeting: DR' ≧T4, where T1 to T4 are thresholds for determining the number n of bits to be allocated to blocks.

The variable-length ADRC is capable of controlling, namely, buffering, the quantity of data to be produced by varying the thresholds T1 to T4. Accordingly, the variable length ADRC can be applied to a transfer circuit, such as a VTR, in which the quantity of data for each field or each frame must be limited to a predetermined value.

A buffering circuit 46 for determining the thresholds T1 to T4 for limiting the quantity of data produced to a predetermined value stores a plurality of threshold sets (T1, T2, T3, T4), for example, thirty-two sets, identified by parametric codes Pi (i=0, 1, 2, ... and 31). The quantity of data to be produced decreases as the subscript "i" of the parametric code Pi increases. The picture quality of the recovered picture deteriorates with the decrease of the quantity of data to be produced.

A comparator 47 receives the thresholds T1 to T4 from the buffering circuit 46 and receives the dynamic range DR' from the subtracter 41 through a delay circuit 48. The delay circuit 48 delays the application of the dynamic range DR' to the comparator 47 for the time required for the buffering circuit 46 to determine a set of thresholds. The comparator 47 compares the dynamic range DR' of each block and the thresholds. The output signal of the comparator 47 is given to the bits' number determining circuit 45 to determine the number n of bits to be allocated to the block. The quantizing circuit 44 converts the data PD1 given thereto through a delay circuit 49 into a code signal DT by edge-matching quantization using the dynamic range DR' and the number n of the allocated bits. The quantizing circuit 44 is, for example, a ROM.

The modified dynamic range DR' and the average MIN' are provided respectively through the delay circuit 48 and a delay circuit 50, the parametric code Pi indicating a threshold set is provided by the buffering circuit 46 and the code signal DT is provided by the quantizing circuit 44. Since signals quantized by nonedge-matching quantization are quantized by edge-matching quantization on the basis of the dynamic range data, the quality of the picture is scarcely deteriorated by dubbing.

The channel encoder 11 and the channel decoder 15 will be described hereinafter.

Figure 6:
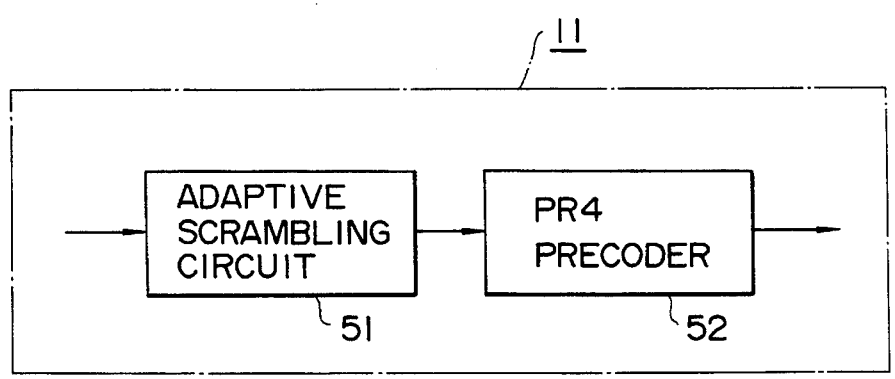
FIG. 6 is a block diagram of a channel encoder.

Referring to FIG. 6, the channel encoder 11 is provided with an adaptive scramble circuit 51 having a plurality of M-systems. The output signal of the parity generating circuit 10 is given to the adaptive scramble circuit 51. An M-system that provides an output signal having the least high-frequency component and the least dc component among the M-systems is selected. A precoder 52 of a partial response class 4 detecting system executes the calculation of $1/(1-D^2)$ (D is a circuit for unit delay). The output signals of the precoder 52 are amplified by the amplifiers 12A and 12B, and the amplified signals are recorded by the magnetic head chips 13A and 13B. In reproducing the signals, reproduced signals are amplified by the amplifiers 14A and 14B.

Figure 7:
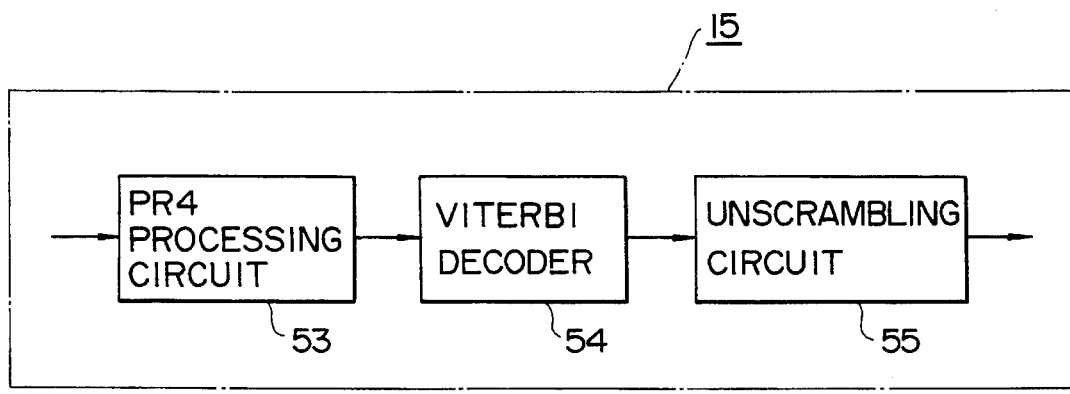
FIG. 7 is a block diagram of a channel decoder.

Referring to FIG. 7, the channel decoder 15 is provided with a partial response class 4 processing circuit 53 for processing the output signals of the amplifiers 14A and 14B for the calculation of 1+D, a so-called Viterbi decoding circuit 54, which is resistant to noise, decodes the output signals of the processing circuit 53 by using the correlation and certainty of data, and an unscrambling circuit 55 for unscrambling the data scrambled by the recording circuit to recover the original data. Block decoding by the Viterbi decoding circuit 54, as compared with bit decoding, improves the S/N ratio by 3 dB.

The magnetic head of the first embodiment for recording the data channel-coded by the foregoing method on a magnetic tape will be described hereinafter.

Figure 8:
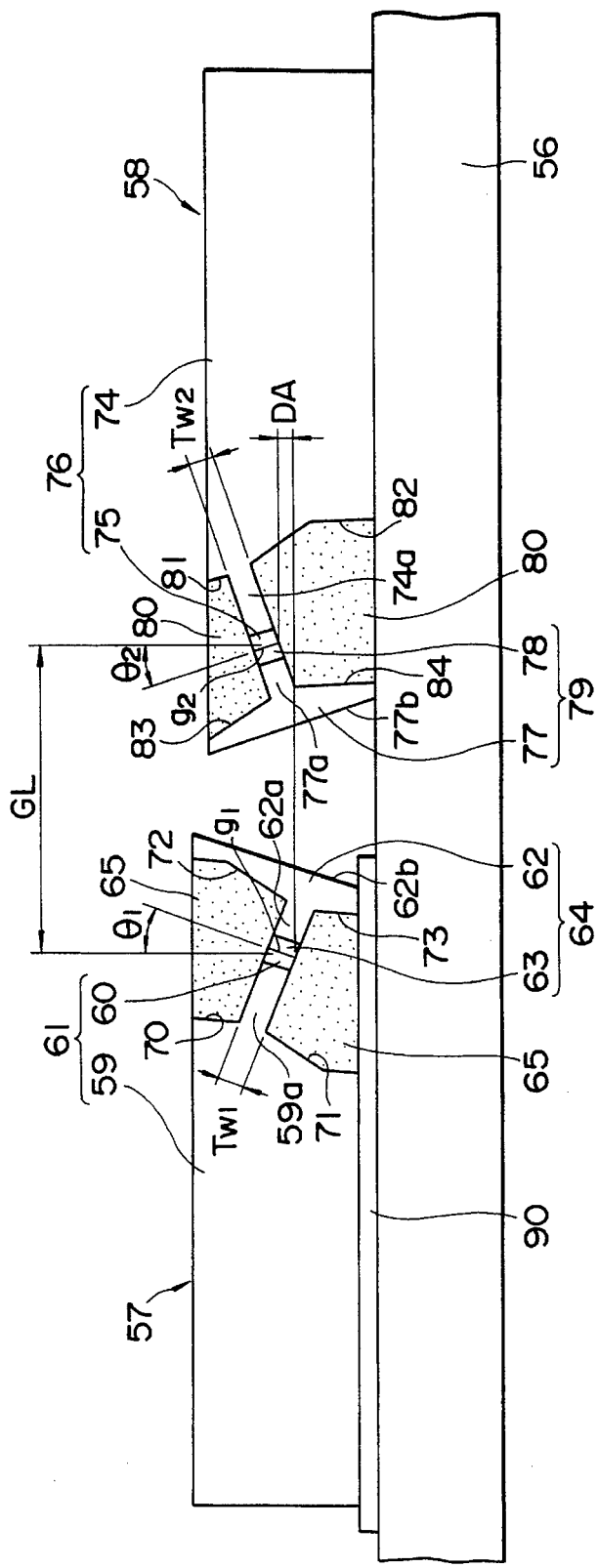
FIG. 8 is an enlarged front view of a magnetic head of the first and second aspects of the present invention.
Figure 9:
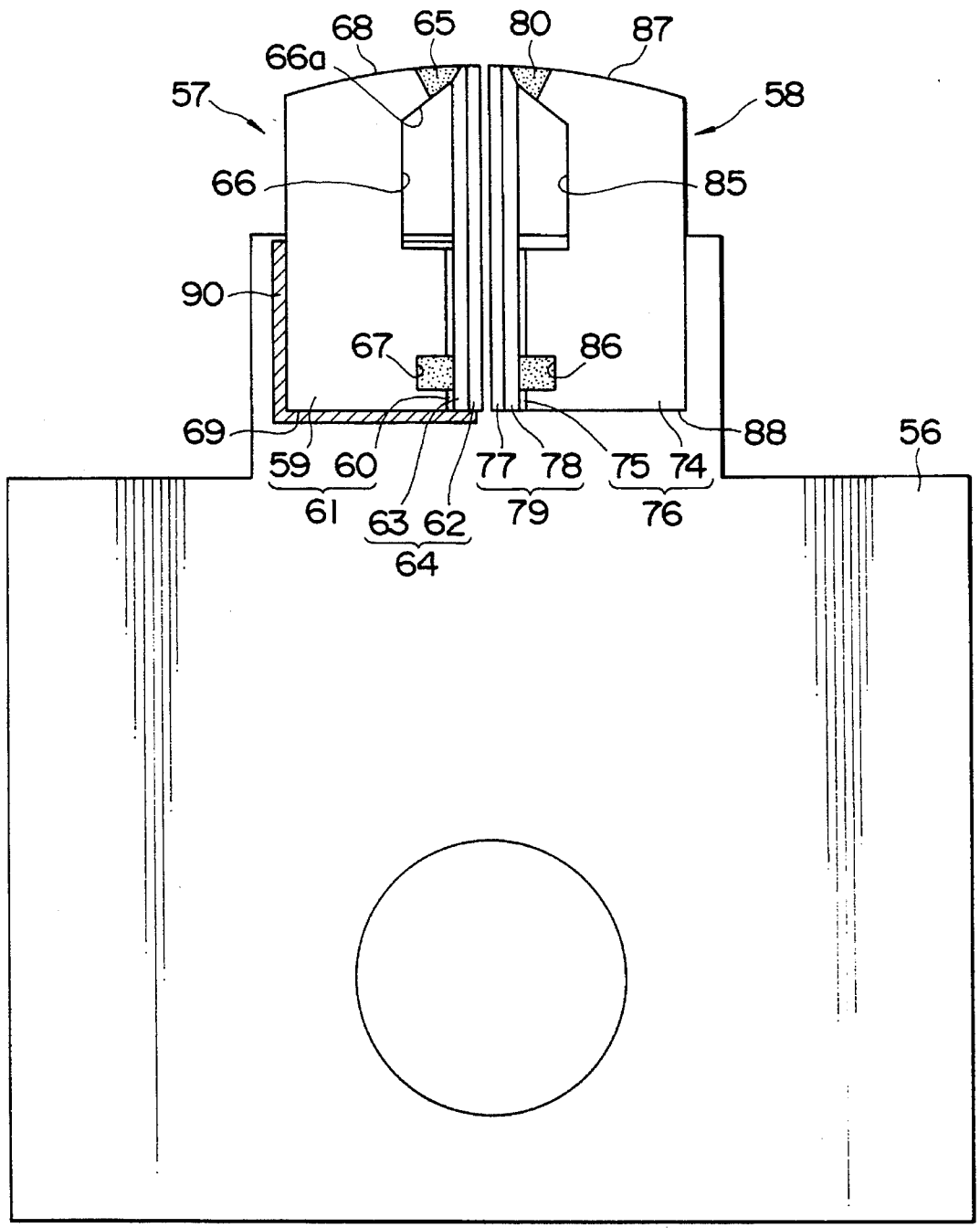
FIG. 9 is a side view of the magnetic head of FIG. 8.

Referring to FIGS. 8 and 9, the magnetic head comprises a head base 56, and a pair of magnetic head chips 57 and 58 mounted on the head base 56 at different azimuth angles, 81 and $\Theta_2$. The pair of magnetic head chips 57 and 58 function simultaneously for recording and reproducing operation. The magnetic head chips 57 and 58 correspond to magnetic head chips 13A and 13B shown in FIGS. 1 and 2.

First the magnetic head chip 57 will be described. The magnetic head chip 57 comprises a first half magnetic core 61 consisting of a magnetic core member 59 of a ferromagnetic oxide and a ferromagnetic metal thin film 60 formed on the magnetic core member 59 by a vacuum thin film forming process, and a second half magnetic core 64 consisting of a magnetic core member 62 of a ferromagnetic oxide and a ferromagnetic metal thin film 63 formed on the magnetic core member 62 similarly to the ferromagnetic metal thin film 60. The first half magnetic core 61 and the second half magnetic core 64 are bonded together by molten glass 65 with the ferromagnetic metal thin films 60 and 63 abutting each other.

The ferromagnetic oxide forming the magnetic core member 59 of the first half magnetic core 61 is a Mn—Zn ferrite or a Ni—Zn ferrite. The magnetic core member 59 is provided in its surface contiguous with the ferromagnetic metal thin film 60 with a groove 66 for containing a coil, not shown, to which recording signals are supplied and by which reproduced signals reproduced from a magnetic tape are obtained, and a recess 67 to be filled with the molten glass 65 to further strengthen the bonding of the first half magnetic core 61 and the second half magnetic core 64 by the molten glass 65. The groove 66 is formed near the surface 68 of the magnetic core 59 to be disposed opposite to a magnetic tape. An inclined surface 66a of the groove 66 on the side of the surface 68 determines the gap depth of the magnetic gap $g_1$ of the magnetic head chip 57. The recess 67 for the molten glass 65 is formed near the surface 69 of the magnetic core member 59 opposite to the surface 68.

The opposite sides, with respect to the direction of thickness of the magnetic head chip 57, of a part of the magnetic core member 59 facing the ferromagnetic metal thin film 60 are recessed to form recesses 70 and 71, and a middle ridge 59a extending in the direction of movement of a magnetic tape. The recesses 70 and 71 are track width defining recesses defining the track width $Tw_1$ of the magnetic gap $g_1$ of the magnetic head chip 57. The middle ridge 59a has a width equal to the track width $Tw_1$ of the magnetic gap $g_1$. The middle ridge 59a is inclined to the direction of movement of the magnetic tape at an angle equal to the azimuth angle $\Theta_1$ of the magnetic gap $g_1$. In this embodiment, the track width $Tw_1$ is 7 µm. The magnetic head chip 57 is able to record recording signals of 0.5 µm in wavelength and a recording density of $8 \times 10_5$ bits/mm$^2$.

The ferromagnetic metal thin film 60 is formed over the entire surface of the middle ridge 59a, excluding parts corresponding to the groove 66 and the recess 67, extending between the opposite surfaces 68 and 69. The ferromagnetic metal thin film 60 is formed of a ferromagnetic material having a high saturation magnetic flux density and excellent soft magnetic characteristic. Ferromagnetic materials meeting such requirements are Fe—Al—Si alloys, Fe—Al alloys, Fe—Si—Co alloys, Fe—Ni alloys, Fe—Al—Ge alloys, Fe—Ga—ge alloys, Fe—Si—Ge alloys, Fe—Co—Si—Al alloys, and Fe—Ga—Si alloys, including Fe—Ga—Si alloys produced by substituting a portion of Fe by Co, containing Fe, Ga, Co and Si as principal ,components and additionally containing at least one of Ti, Cr, Mn, Zr, Nb, Mo, Ta, W, Ru, Os, Rh, Ir, Re, Ni, Pb, Pt, Hf, and V to improve the corrosion resistance and abrasion resistance of the Fe—Ga—Si alloys. It is also possible to form a ferromagnetic metal thin film of a ferromagnetic amorphous alloy, such as an alloy composed of at least one of Fe, Ni and Co and at least one P, C, B and Si, a metal-metalloid amorphous alloy containing the said alloy as a principal component with Al, Ge, Be, Sn, In, Mo, W, Ti, Mn, Cr, Zr, H or Nb, or a metal-metal amorphous alloy containing, as principal components, a transition element, such as Co, Hf or Zr, and a rare earth element.

It is preferable to form the ferromagnetic metal thin film 60 of a ferromagnetic material having a saturation magnetic flux density of 14 kG or above, such as a Fe—Ga—Si—Ru alloy having a saturation magnetic flux density of 14.5 kG, to enable high-density recording at $5 \times 10^5$ bits/mm$^2$ or above. Because ferromagnetic metal thin film 60 is formed of a ferromagnetic material having such a high saturation magnetic flux density, it is able to record signals on a magnetic tape having a high coercive force without magnetic saturation.

The ferromagnetic metal thin film may be formed by a vacuum thin film forming process, such as an evaporation process, a sputtering process, or an ion plating process.

The magnetic core member 62 of the second half magnetic core 64 has a small thickness, namely, a size along the direction of movement of a magnetic tape, and is formed, similarly to the magnetic core member 59, of a ferromagnetic oxide, such as Mn—Zn ferrite or a Ni—Zn ferrite. The opposite sides of a part of the magnetic core member 62 facing the ferromagnetic metal thin film 63 are cut to form recesses 72 and 73 defining the track width $Tw_1$ of the magnetic gap $g_1$ of the magnetic head chip 57, and an elongate middle ridge 62a extending along the direction of movement of a magnetic tape and having a width (7 µm) equal to the track width $Tw_1$ of the magnetic gap $g_1$. The middle ridge 62a is inclined, similarly to the middle ridge 59a, at an angle equal to the azimuth angle $\theta_1$ of the magnetic gap $g_1$ to the direction of movement of a magnetic tape. The surface 62b of the magnetic core member 62 opposite to the surface in which the middle ridge 62a is formed is inclined to a direction perpendicular to the direction of movement of a magnetic tape.

The ferromagnetic metal thin film 63 is formed on the entire surface of the middle ridge 62a extending between the opposite surfaces 68 and 69 of the magnetic core member 62. The ferromagnetic metal thin film 63 is formed of the same material as that forming the ferromagnetic metal thin film 60.

The first half magnetic core 61 and the second half magnetic core 64 are bonded together with the ferromagnetic metal thin films 60 and 63 abutting each other by filling cavities defined by the opposite recesses 70 and 72 and the opposite recesses 71 and 73 with the molten glass 65. In bonding the first half magnetic core 61 and the second half magnetic core 64 together, the magnetic gap $g_1$ of the track width $Tw_1$ is formed between the ferromagnetic metal thin films 60 and 63 by placing a gap spacer between or by filling a space between the ferromagnetic metal thin films 60 and 63. The magnetic gap $g_1$ extends at an angle equal to the azimuth angle $\theta_1$ and measured in a clockwise direction to a direction perpendicular to the direction of movement of a magnetic tape.

Preferably, the azimuth angle $\theta_1$ is not smaller than 10° to suppress crosstalk between the magnetic head chips 57 and 58. In this embodiment, the azimuth angle $\Theta_1$ of the magnetic gap $g_1$ is 20°. When the magnetic head chip 57 is operated in an automatic tracking mode in recording signals on and reproducing signals recorded on a track, the magnetic head chip 57 picks up signals recorded on the adjacent tracks. Accordingly, it is desirable that the track width $Tw_1$ of the magnetic gap $g_1$ be greater by a value in the range of 0 µm to 3 µm than the track pitch P of the tracks formed on a magnetic tape. If the track width $Tw_1$ of the magnetic gap $g_1$ is excessively large, crosstalk between the adjacent tracks occurs.

The construction of the other magnetic head chip 58 is the same as that of magnetic head chip 57. The magnetic head chip 58 comprises a third half magnetic core 76 consisting of a magnetic core member 74 formed of a ferromagnetic oxide and a ferromagnetic metal thin film 75 formed on the magnetic core member 74, and a fourth half magnetic core 79 consisting of a magnetic core member 77 formed of a ferromagnetic oxide and a ferromagnetic metal thin film 78 formed on the magnetic core member 77. The third half magnetic core 76 and the fourth half magnetic core 79 are bonded together by molten glass 80 with the ferromagnetic metal thin films 75 and 78 abutting each other.

The opposite sides of a part of the magnetic core member 74 (77) of the magnetic head chip 58 facing the ferromagnetic metal thin film 75 (78) are cut to form recesses 81 and 82 (83 and 84) and an elongate middle range 74a (77a) extending along the direction of movement of a magnetic tape. The recesses 81 and 82 (83 and 84) define the track width $Tw_2$ of the magnetic gap $g_2$ of the magnetic head chip 58, and hence the middle ridge 74a (77a) has a width equal to the track width $Tw_2$ of the magnetic gap $g_2$. The ferromagnetic metal thin films 75 and 78 are formed on the middle ridges 74a and 77a, respectively.

The middle ridges 74a and 77a are inclined at an angle equal to the azimuth angle $\theta_2$ of magnetic gap $g_2$ to the direction of movement of a magnetic tape in a direction opposite to the direction of inclination of the middle ridges 59a and 62a of the magnetic head chip 57. A recess 85 for containing a coil and a groove 86 are formed in the surface of the magnetic core member 74 facing the ferromagnetic metal thin film 75. The surface 77b of the magnetic core member 77 opposite to the surface of the same in which the middle ridge 77a is formed is inclined in a direction opposite to the inclination of the surface 62b of the magnetic core member 62 of the magnetic head chip 57.

The ferromagnetic metal thin films 75 and 78 are formed on the entire surfaces of the middle ridges 74a and 77a between the surface 87 of the magnetic core member 74 to be exposed to a magnetic tape and the opposite surface 88 of the same by a vacuum thin film forming process.

The third half magnetic core member 76 and the fourth half magnetic core member 79 of the magnetic head chip 58 are bonded together with the ferromagnetic metal thin films 75 and 78 abutting each other by filling lap cavities defined by the pair of recesses 81 and 82 and the pair of recesses 83 and 84 with the molten glass 80. The magnetic gap $g_2$ of the track width $Tw_2$ is formed between the ferromagnetic metal thin films 75 and 78. The magnetic gap $g_2$ is inclined at an angle equal to the azimuth angle $\Theta_2$ in a counter-clockwise direction to a direction perpendicular to the direction of movement of a magnetic tape. The azimuth of the magnetic gap $g_1$ of the magnetic head chip 57 and that of the magnetic gap $g_2$ of the magnetic head chip 58 are opposite to each other, and the respective azimuth angles $\theta_1$ and $\theta_2$ of the magnetic gaps $g_1$ and $g_2$ are equal to each other.

The pair of magnetic head chips 57 and 58 thus constructed are disposed on the head base 56 with their inclined surfaces opposite to each other to form a so-called double-azimuth magnetic head. The magnetic head chips 57 and 58 are disposed as shown in FIG. 8 in a stepped arrangement with a step DA equal to the pitch P of tracks formed on a magnetic tape 89 with respect to a direction indicated by the arrow Y in FIG. 8 along which the tracks are arranged. The step DA is the distance between the respective ends of the magnetic gaps $g_1$ and $g_2$ of the magnetic head chips 57 and 58 with respect to the direction of the width of the tracks on the side of the head base 56.

The magnetic head chip 57 is seated on a spacer 90, such as a Cu foil, having a thickness equal to the step DA and placed on the surface of the head base 56 and the magnetic head chip 58 is seated directly on the surface of the head base 56 to dispose magnetic head chips 57 and 58 in a stepped arrangement with a step DA between the respective magnetic gaps $g_1$ and $g_2$ of the magnetic head chips 57 and 58. Accordingly, the magnetic gap $g_1$ of the magnetic head chip 57 seated on the spacer 90 is raised by the step DA from the surface of the head base 56 relative to the magnetic gap $g_2$ of the magnetic head chip 58.

Since the step DA must be equal to the pitch P of the tracks, the step DA in this embodiment, hence the thickness of the spacer 90 is 5 μm because the pitch P is 5 μm.

Figure 10:
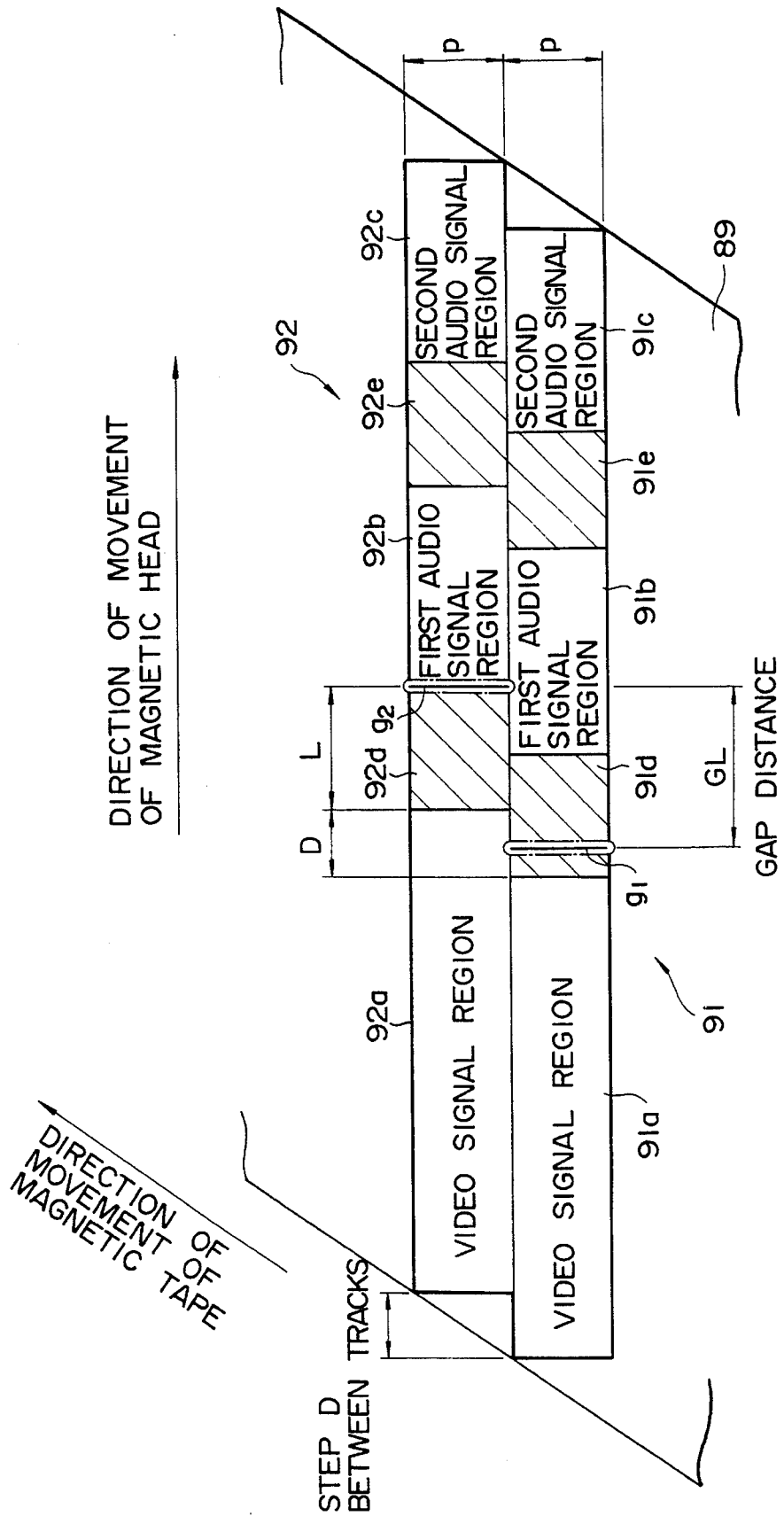
FIG. 10 is a diagram of the format of a magnetic tape on which digital video signals and audio signals are recorded by the magnetic head of FIG. 8.

The gap distance GL between the respective magnetic gaps $g_1$ and $g_2$ of magnetic head chips 57 and 58 with respect to the direction of the movement of the magnetic head indicated by the arrow X in FIG. 8 is shorter than the sum of step D between tracks 91 and 92, and the length L of the interblock gap regions 91d, 91e, 92d and 92e formed respectively between video signal regions 91a and 92a and audio signal regions 91b, 91c, 92b and 92c of tracks 91 and 92 on the magnetic tape 89 as shown in FIG. 10. The interblock gap regions 91d, 91e, 92d and 92e are regions in which audio signals may or may not be recorded by after-recording or those in which no video signals or the like are recorded. The gap distance GL is the center distance between the magnetic gaps $g_1$ and $g_2$ of the magnetic head chips 57 and 58 with respect to the direction of movement of the magnetic head.

The gap distance GL is determined taking into consideration after-recording, for example, when the length L of interblock gap regions 91d, 91e and 92d and 92e is 250 μm, gal distance GL is about 200 μm. Also taken into consideration in determining the gap distance GL are securing the video signal regions 91a and 92a for extended recording and reproducing and forming the magnetic core members 62 and 77 with a sufficiently large sectional area for sufficiently high head efficiency.

The head base of the magnetic head thus provided with the magnetic head chips 57 and 58 is attached to a rotary drum. The rotary drum is rotated while the magnetic tape 89 runs relative to the rotary drum along the circumference of the rotary drum to form a recording pattern as shown in FIG. 10 by the magnetic head. Since the magnetic head chips 57 and 58 are disposed with the gap distance GL with respect to the direction of movement of the magnetic head shorter than the sum of the step D between adjacent tracks and the length L of the interblock gaps regions 91d, 91e, 92d and 92e formed between the video signal regions 91a and 92a and the audio signal regions 91b, 91c, 92b and 92c, satisfactory after-recording can be achieved.

The magnetic gap $g_1$ of the succeeding magnetic head chip 57 is in the interblock gap region 91d between the video signal region 91a and the first audio signal region 91b when the magnetic gap $g_2$ of the preceding magnetic head chip 58 is at the front end of the first audio signal region 92b. When the recording of an audio signal is started for after-recording in this state, after-recording can be achieved satisfactorily without disturbing the picture. If no audio signal is recorded by after-recording the first audio signal regions 91b and 92b and audio signals are recorded by after-recording only in the second audio signal regions 91c and 92c, the first audio signal regions 91b and 92b serve as interblock gap regions.

Figure 11:
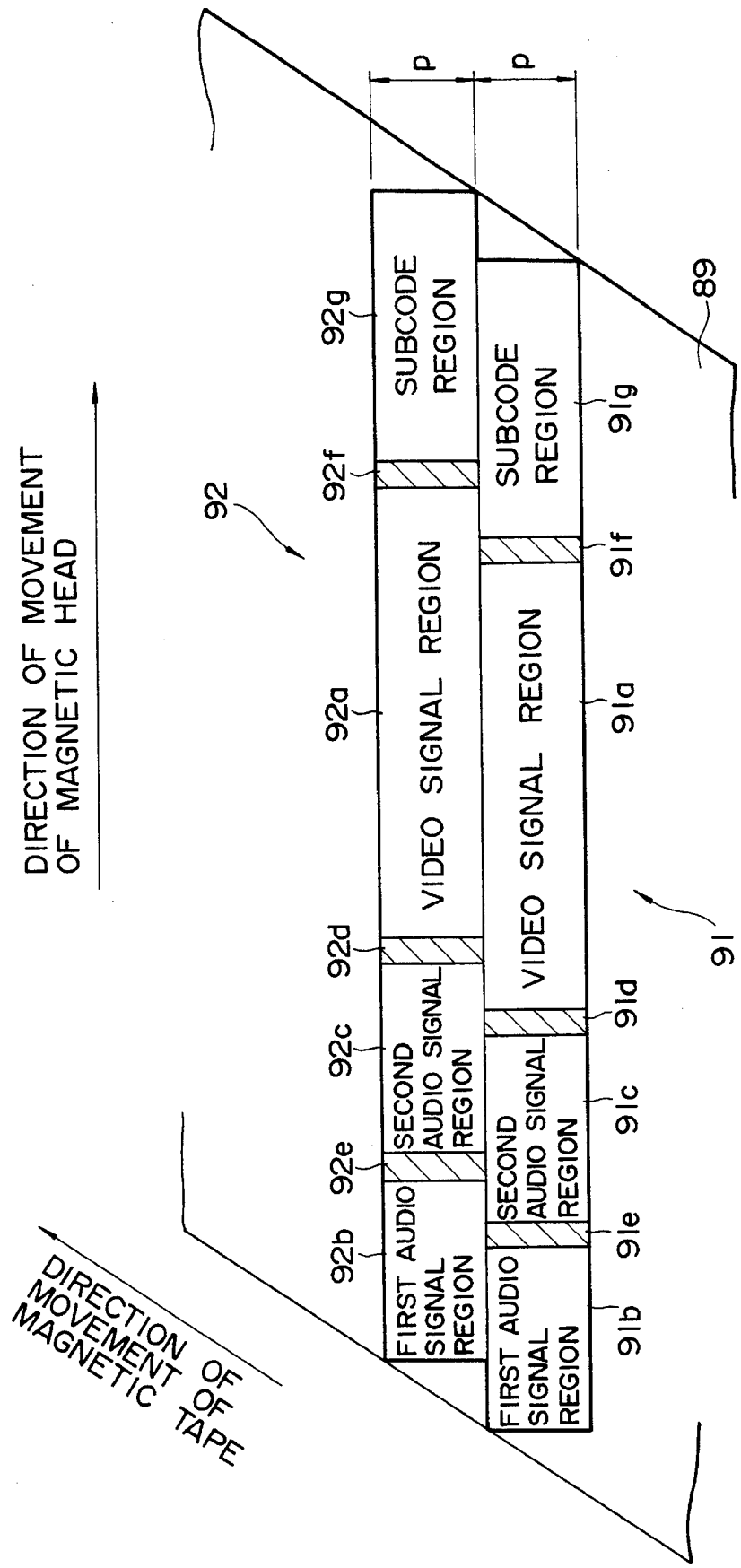
FIG. 11 is a diagram of the format of another magnetic tape on which signals are recorded by the magnetic head of FIG. 8.

The magnetic head in this embodiment is capable of satisfactorily achieving after-recording on a magnetic tape having a tape format as shown in FIG. 11. An operation for reproducing video signals recorded in video signal regions 91a and 92a in a tape format shown in FIG. 11 while recording audio signals in first audio signal regions 91b and 92b by after-recording and not recording any audio signals in second audio signal regions 91c and 92c in FIG. 11 will be described hereinafter. An audio signal is after-recorded in the first audio signal region 92b by the preceding magnetic head chip 58, and then, an audio signal is after-recorded in the first audio signal region 91b of the track 91 by the succeeding magnetic head chip 57. At the end of after-recording, the magnetic gap $g_1$ of the succeeding magnetic head chip 57 is at the rear end of the first audio signal region 91b while the magnetic gap $g_2$ of the preceding magnetic head chip 58 is in the second audio signal region 92c. Accordingly, the video signal is reproduced from the video signal region 92a by the preceding magnetic head chip 58 after the completing of the after-recording operation of the succeeding magnetic head chip 57, so that a satisfactory picture can be reproduced during after-recording.

The tape format shown in FIG. 11 has subcode regions 91g and 92g for recording time codes or control signals for searching. Interblock gap regions 91f and 92f are formed between the subcode regions 91g and 92g, the video signal regions 91a and 92a, respectively, and second audio signal regions 91c and 92c serve as interblock gap regions.

Since the magnetic head is provided with the two magnetic head chips 57 and 58 mounted on the head base 56, and the two magnetic head chips 57 and 58 operate for simultaneous recording and reproducing, extended recording and reproducing of digital video signals are possible without increasing the bit error rate attributable to an abnormal track pattern, even if digital video signals are recorded on the magnetic tape 89 of a width not greater than 8 mm at a recording density of $5 \times 10^5$ bits/mm$^2$.

If two magnetic head chips respectively having different azimuth angles are disposed diametrically opposite to each other on a rotary drum, and signals are recorded on an 8 mm wide magnetic tape 89 at a recording density of $5 \times 10^5$ bits/mm$^2$ or higher by the magnetic head chips, an abnormal track period occurs, in which some of signals recorded by the preceding magnetic head chip are erased by the succeeding magnetic head chip due to the eccentricity of the rotary drum or some other cause. Accordingly, the ratio of erased signals to remaining signals increases, sufficiently high reproducing output is unavailable and the bit error rate increases greatly. Since the magnetic head in this embodiment is provided with the two magnetic head chips 57 and 58 disposed on the head base 56, the recording tracks 91 and 92 recorded respectively by the magnetic head chips 57 and 58 are inclined in the same direction and hence the recording tracks 91 and 92 do not overlap each other excessively even if the rotary drum is eccentric. Accordingly, a sufficiently high reproducing output can be provided and the bit error rate does not increase.

Figure 12:
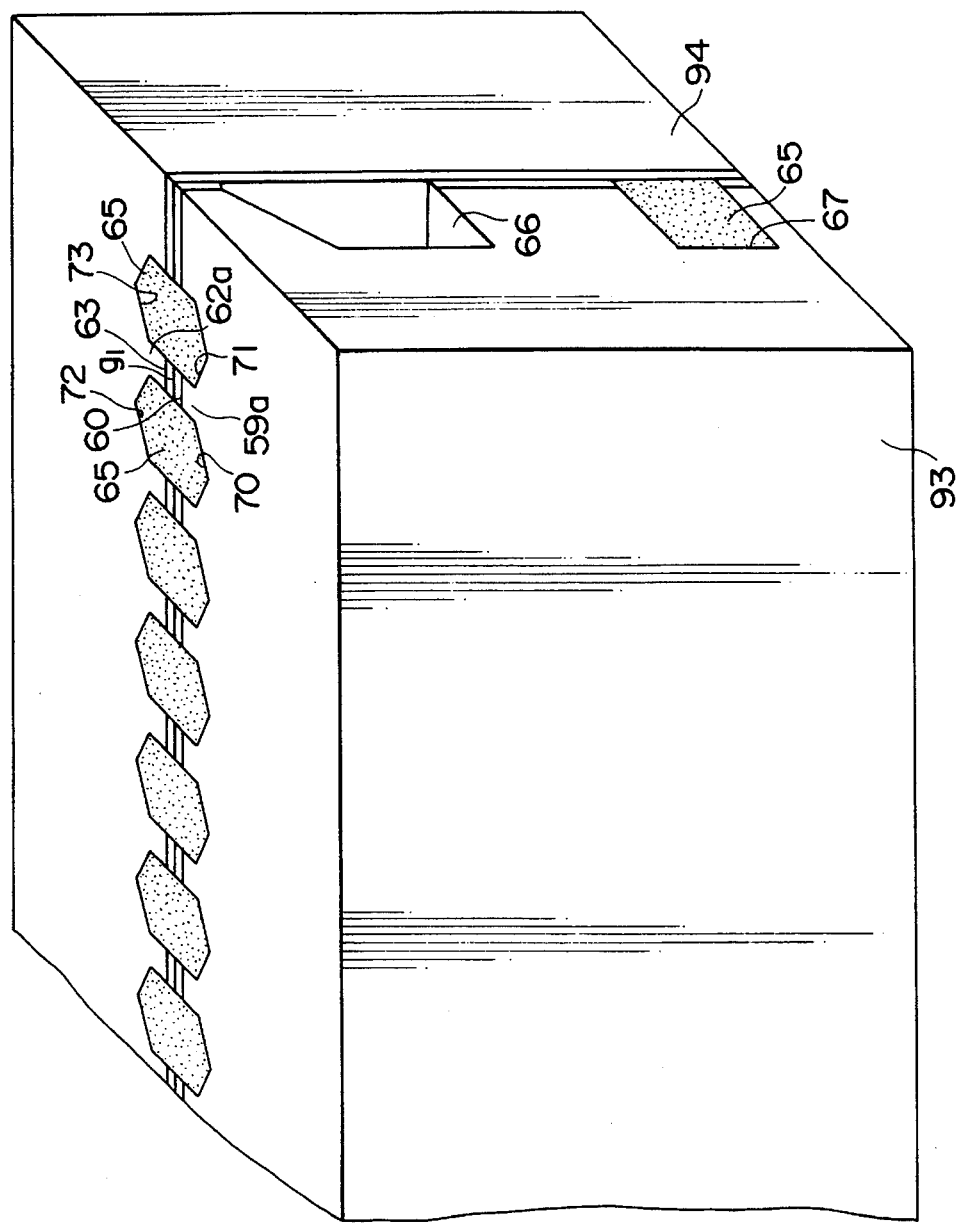
FIG. 12 is an enlarged perspective view that depicts a glass-bonding process in a method of fabricating the magnetic head of FIG. 8.

The magnetic head is fabricated by the following process. First, as shown in FIG. 12, a ferromagnetic metal thin film 60 is formed by sputtering over the entire surface of a major surface of a Mn—Zn ferrite block 93 of 2 mm in width. Then, the recess 66 for coils and the groove 67 for molten glass are formed longitudinally in the major surface of the Mn—Zn ferrite block 93.

Then, the recesses 70 and 71 for defining track width are formed in the major surface of the Mn—Zn ferrite block 93 along a direction perpendicular to the groove 66 and the recess 67. The respective numbers of the recesses 70 and 71 correspond to the number of magnetic heads to be fabricated. The recesses 70 and 71 are arranged alternately along the longitudinal direction of the ferrite block 93. The middle ridges 59a, on which the ferromagnetic metal thin film 60 is to be formed, are formed between the recesses 70 and 71. The width of the middle ridges 59a is equal to the track width Tw$_1$ of the magnetic gap g$_1$.

Similarly, a ferromagnetic metal thin film 63 is formed by sputtering entirely over a major surface of a Mn—Zn ferrite block 92 of 2 mm in width. The recesses 72 and 73 are formed alternately in the major surface of the ferrite block 94 along the longitudinal direction of the ferrite block 94. The respective numbers of the recesses 72 and 73 are equal to the number of magnetic heads to be formed. The middle ridges 62a, on which the ferromagnetic metal thin film is to be formed, is formed between the recesses 72 and 73. The width of the middle ridges 62a is equal to the track width Tw$_1$ of the magnetic gap Then, the ferrite blocks 93 and 94 are joined together with the ferromagnetic metal thin films 60 and 63 facing each other and with the corresponding middle ridges 59a and 62a positioned opposite to each other, and then cavities defined by the recesses 70, 71, 72 and 73 are filled up with the molten glass 65 to bond the ferrite blocks 93 and 94 together. Thus, the spaces between the ferromagnetic metal thin films 65 are filled up with the molten glass 65 to form magnetic gaps g$_1$. A nonmagnetic film, such as SiO$_2$ film, of a predetermined thickness may be formed beforehand between the ferromagnetic metal thin films 60 and 63 as a spacer.

Figure 13:
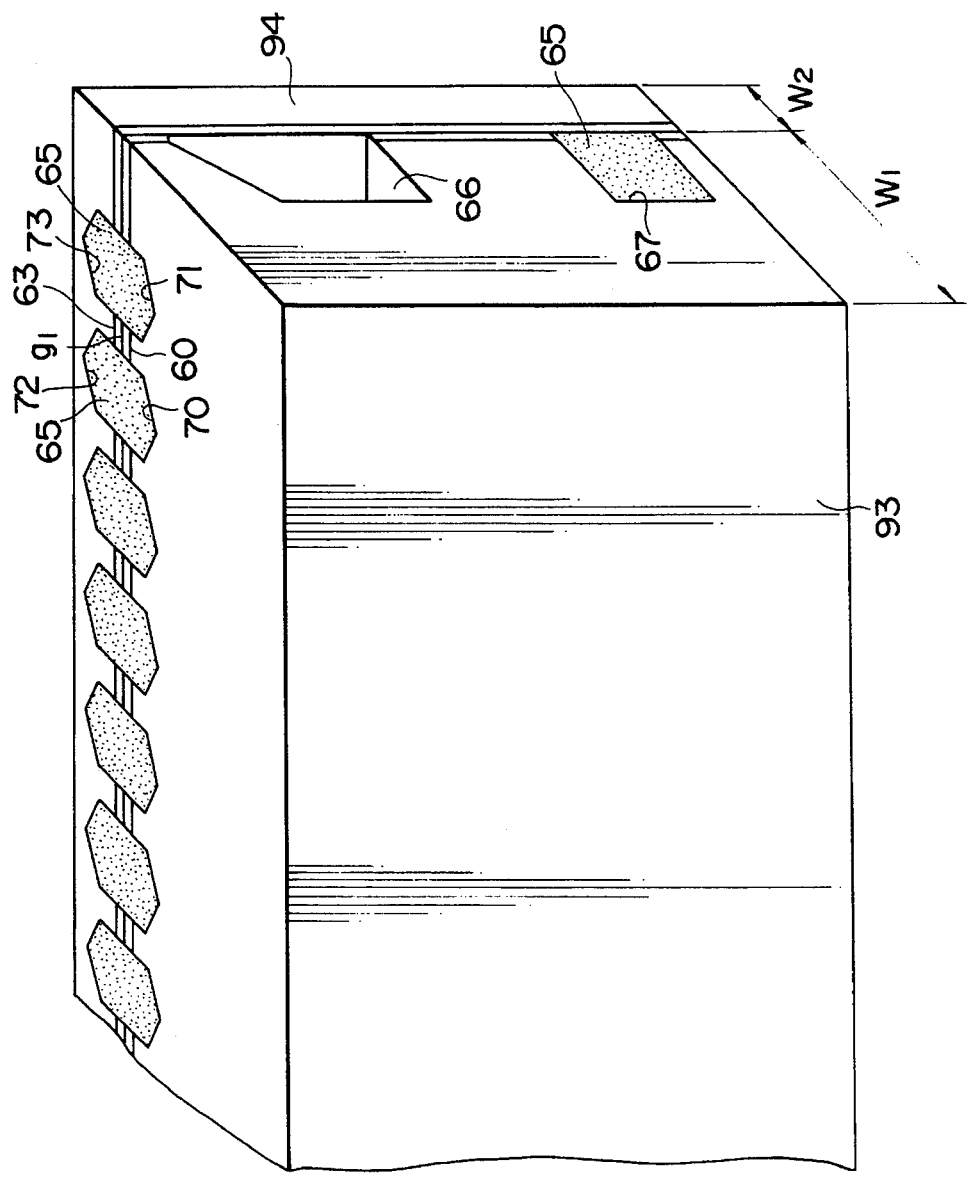
FIG. 13 is an enlarged perspective view that depicts a grinding process for finishing magnetic head chips in a predetermined length with respect to the direction of movement of the magnetic head of FIG. 8.

Then, the other major surfaces of the ferrite blocks 93 and 94 are finished flat by grinding. As shown in FIG. 13, the width W$_1$ of the ferrite block 93 provided with the grooves 66 is 750 μm and the width W$_2$ of the other ferrite block 94 is 50 μm.

Figure 14:
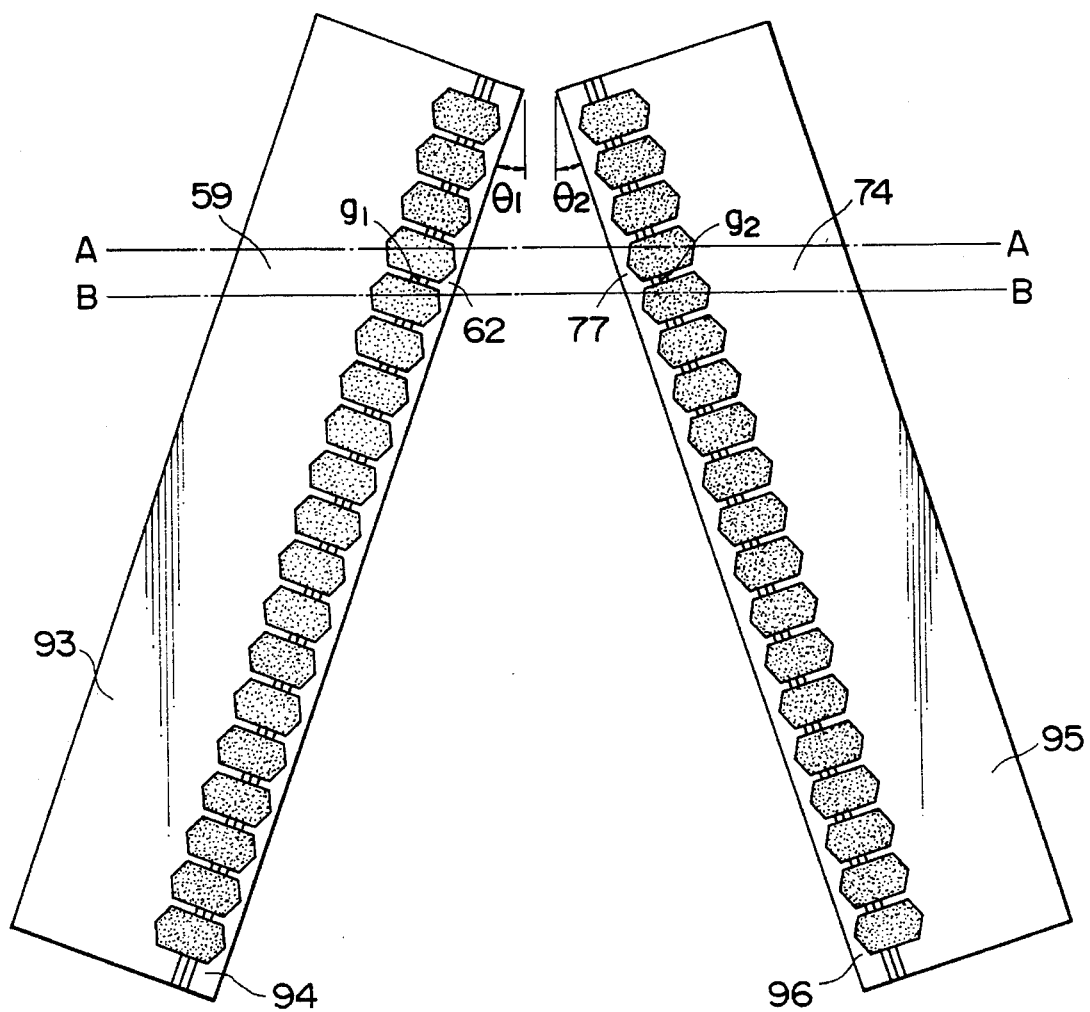
FIG. 14 is an enlarged front view that depicts a magnetic head chip dicing process in the method of fabricating the magnetic head of FIG. 8.

The same assembly of ferrite blocks 95 and 96 as the assembly of the ferrite blocks 93 and 94 is fabricated by the same process. The assembly of the ferrite blocks 93 and 94 and the assembly of the ferrite blocks 95 and 96 are arranged at opposite inclinations in the shape of the inverted letter V with the corresponding magnetic gaps opposite to each other as shown in FIG. 14. The angle θ$_1$ between the surface of the ferrite block 94 facing the surface of the ferrite block 96 and vertical line and the angle θ$_2$ between the surface of the ferrite block 96 facing the surface of the ferrite block 94 and a vertical line are 20° corresponding to the azimuth angle of magnetic gaps g$_1$ and g$_2$.

The ferrite blocks 93, 94, 95 and 96 are fixed in this arrangement, and the ferrite blocks 93, 94, 95 and 96 are cut along lines A—A and B—B as shown in FIG. 14 to obtain a pair of magnetic head chips 57 and 58 respectively having azimuth angles θ$_1$ and θ$_2$ shown in FIGS. 8 and 9.

The magnetic head chip 57 is fixed adhesively to a Cu spacer of 5 μm in thickness attached to the head base 56, and the other magnetic head chip 58 is fixed adhesively to the surface of the head base 56 so that the magnetic gap distance GL is 200 μm. Then, coils are mounted on the magnetic head chips 57 and 58 to complete the same.

Second Embodiment

A digital recording magnetic head according to a second embodiment according to the present invention corresponds to those in the third and fourth aspects as discussed above.

A digital recording magnetic head according to the second embodiment is provided with a pair of magnetic head chips having magnetic gaps of different azimuth angles, compresses recording signals without entailing significant distortion in reproduced signals and permits extended digital video signal recording on tracks of 8 μm or less in width on a narrow magnetic tape of 8 mm or less in width at a recording wavelength of 0.5 μm and a high bit density of $5 \times 10^5$ bits/mm$^2$ or above. A method of compressing recording signals without entailing significant distortion in reproduced signals to be carried out by this digital recording magnetic head is the same as that to be carried out by the digital recording magnetic head in the first embodiment, and hence the description thereof will be omitted.

Figure 15:
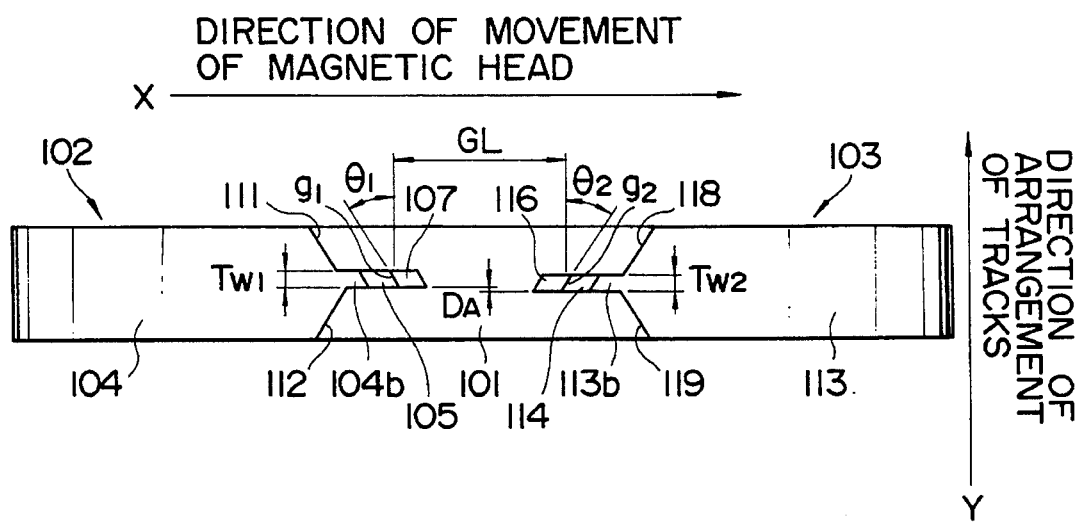
FIG. 15 is an enlarged front view of an essential portion of a magnetic head of the third and fourth aspects of the present invention.
Figure 16:
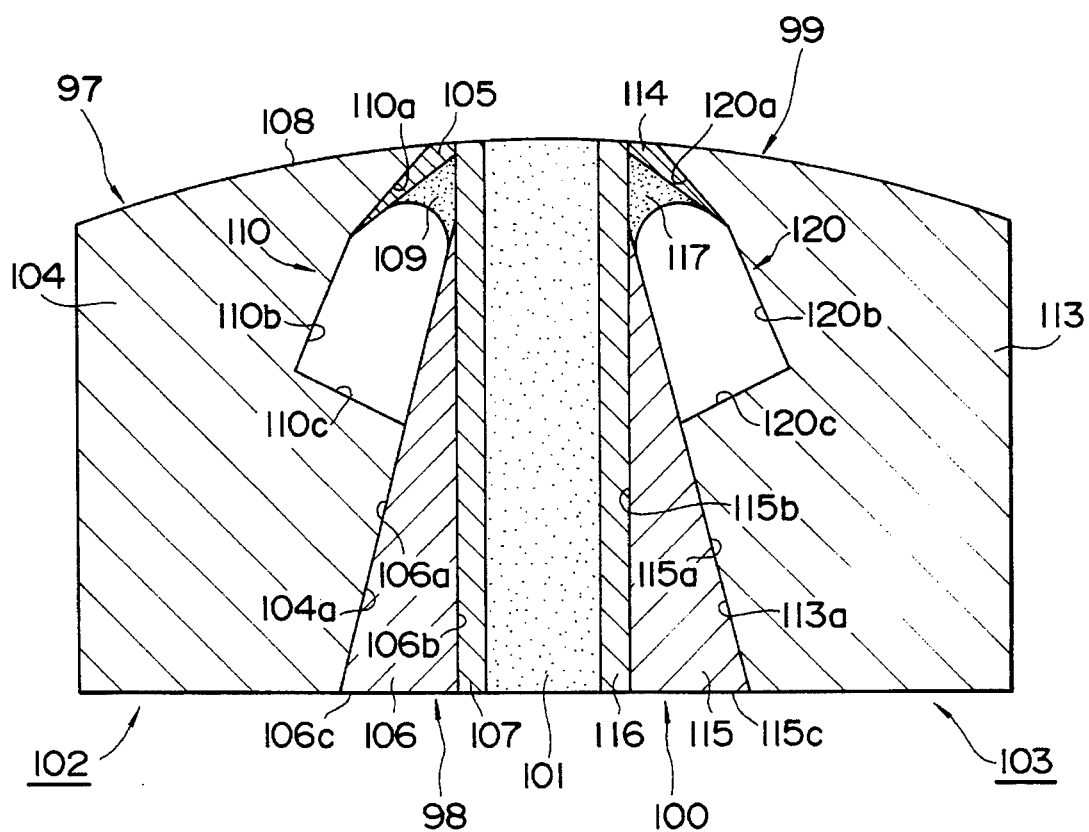
FIG. 16 is an enlarged sectional view of the magnetic head of FIG. 15.

Referring to FIGS. 15 and 16, a first half magnetic core 97 and a second half magnetic core 98 forming a magnetic gap g$_1$ with an azimuth angle Θ$_1$, and a third half magnetic core 99 and a fourth half magnetic core 100 forming a magnetic gap g$_2$ with an azimuth angle θ$_2$ are bonded together by a nonmagnetic material 101. The magnetic gaps g$_1$ and g$_2$ function for simultaneous recording and reproducing. The combination of the first half magnetic core 97 and the second half magnetic core 98 forming a closed magnetic path will be designated as a first magnetic head unit 102, and the third half magnetic core 99 and the fourth half magnetic core 100 forming a closed magnetic path will be designated as a second magnetic head unit 103. The magnetic head units 102 and 103 correspond respectively to the magnetic heads 13A and 13B shown in FIG. 13A and 13B.

Since the magnetic head units 102 and 103 are similar in construction, the magnetic head unit 102 will be described hereinafter.

The magnetic head unit 102 comprises the first half magnetic core 97 consisting of a magnetic core member 104 formed of a ferromagnetic oxide and a ferromagnetic metal thin film 105 formed by a vacuum thin film forming process on the magnetic core member 104, and the second half magnetic core 98 consisting of a magnetic core member 106 formed of a ferromagnetic oxide and a ferromagnetic metal thin film 107. The first half magnetic core 97 and the second half magnetic core 98 are joined together by bonding together the ferromagnetic metal thin film 105 and the ferromagnetic metal thin film 107 by molten glass 109 on the side of a polished cylindrical, contact surface 108 to be disposed opposite to a magnetic recording medium. A magnetic gap $g_1$ is formed between the ferromagnetic metal thin films 105 and 107.

The magnetic core member 104 of the first half magnetic core 97 is formed of a ferromagnetic oxide, such as a Mn—Zn ferrite or a Ni—Zn ferrite. A recess 110 for receiving a coil is formed in the surface of the magnetic core member 104 facing the second half magnetic core 98. The recess 110 is formed near the contact surface 108 and is defined by a first inclined surface 110a extending from the contact surface 108, a second inclined surface 110b extending from the inner end of the first inclined surface 110a, and a third inclined surface 110c extending from the inner end of the second inclined surface 110b. The coil, not shown, to which recording signals are supplied and from which reproduced signals are provided is wound on the second inclined surface 110b. A surface 104a of the magnetic core member 104 formed behind the recess 110 and facing the second half magnetic core 98 is inclined substantially parallel to the second inclined surface 110 so that the thickness of the magnetic core member 104 with respect to the direction of movement of the magnetic head unit indicated by the arrow X in FIG. 15 is decreased.

The opposite ends of a portion of the magnetic core member 104 facing the second half magnetic core 98 are cut in the direction of thickness of the chip indicated by the arrow Y corresponding to a direction along which tracks are arranged to form a narrow, middle ridge 104b extending in the direction of the arrow X and recesses 111 and 112. The track width $Tw_1$ of the magnetic gap $g_1$ of the magnetic head unit 102 is defined by the recesses 111 and 112. The width of the middle ridge 104b is equal to the track width $Tw_1$ of the magnetic gap $g_1$. In this embodiment, the track width $Tw_1$ is 7 µm, and the signals are recorded at a recording wavelength of 0.5 µm and a recording density of $8 \times 10^5$ bits/m². The middle ridge 104b is inclined at a predetermined angle equal to the azimuth angle $\theta_1$ of the magnetic gap $g_1$ with respect to the direction of movement of the magnetic head to determine the azimuth of the magnetic gap $g_1$ of the magnetic head unit 102.

The ferromagnetic metal thin film 105 is formed only over the first inclined surface 110a of the recess 110 of the magnetic core member 104. A portion of the ferromagnetic metal thin film 105 formed on the middle ridge 104b is exposed in the contact surface 108. The ferromagnetic metal thin film 105 exposed in contact surface 108 and facing the second half magnetic core 98 forms a surface inclined at an angle equal to the azimuth angle $\theta_1$ of the magnetic gap $g_1$.

The ferromagnetic metal thin film 105 is formed of a ferromagnetic material having a high saturation magnetic flux density and an excellent soft magnetic characteristic. Ferromagnetic materials meeting such requirements are Fe—Al—Si alloys, Fe—Al alloys, Fe—Si—Co alloys, Fe—Ni alloys, Fe—Al—Ge alloys, Fe—Ga—Ge alloys, Fe—Si—Ge alloys, Fe—Co—Si—Al alloys or Fe—Ge—Si alloys containing Fe, Ga, Co and Si as principal components, including those produced by substituting a portion of Fe of the Fe—Ga—Si alloys with Co, and additionally containing at least one of Ti, Cr, Mn, Zr, Nb, Mo, Ta, W, Ru, Os, Rh, Ir, Re, Ni, Pb, Pt, Hf and V to improve the corrosion resistance and abrasion resistance of the Fe—Ga—Si alloys.

It is also possible to form the ferromagnetic metal thin film of a ferromagnetic amorphous alloy, such as an alloy composed of at least one of Fe, Ni and Co and at least one of P, C, B and Si, a metal-metalloid amorphous alloy containing the said alloy as a principal component and Al, Ge, Be, Sn, In, Mo, W, Ti, Mn, Cr, Zr, H or Nb, or a metal-metal-amorphous alloy containing, as principal components, a transition element, such as Co, Hf or Zr, and a rare earth element.

It is preferable to use a ferromagnetic material having a saturation magnetic flux density of 14 kG or above, such as a Fe—Ga—Si—Ru alloy having a saturation magnetic flux density of 14.5 kG, to enable high-density recording at $5 \times 10^5$ bits/mm² or above.

The ferromagnetic metal thin film is formed by a vacuum thin film forming process, such as an evaporation process, a sputtering process or an ion plating process.

The magnetic core member 106 of the second half magnetic core 98 is formed, similarly to the magnetic core member 104, of a ferromagnetic oxide, such as a Mn—Zn ferrite or a Ni—Zn ferrite. The magnetic core member 106 has a cross section substantially resembling a right triangle, and a surface 106a put in close contact with the inclined surface 104a of the magnetic core member 104 with its apex at a position corresponding to the middle portion of the recess 110. The width (7 µm) of the magnetic core member 106 is substantially equal to the track width $Tw_1$ of the magnetic gap $g_1$.

The ferromagnetic metal thin film 107 is formed, similarly to the ferromagnetic metal thin film 105, of a ferromagnetic material on the surface 106b opposite the inclined surface 106a of the magnetic core member 106 between the contact surface 108 and opposite surface 106c. That is, the ferromagnetic metal thin film 107 is formed in a strip of a width equal to that of the magnetic core member 106 corresponding to the track width $Tw_1$ of the magnetic gap $g_1$ between the contact surface 108 and the back surface. The surface of the ferromagnetic metal thin film 107 facing the ferromagnetic metal thin film 105 formed on the first half magnetic core 97 is inclined at an angle equal to the azimuth angle $\theta_1$ of the magnetic gap $g_1$.

Accordingly, only the ferromagnetic metal thin film 107 of the second half magnetic core 98, having a width substantially equal to the track width $Tw_1$ of the magnetic gap $g_1$ is exposed in contact surface 108.

The first half magnetic core 97 and the second half magnetic core 98 are bonded together with ferromagnetic metal thin films 105 and 107 abutting each other on the side of the contact surface 108 and with the magnetic core members 104 and 106 abutting each other on the back side by filling up a space between the ferromagnetic metal thin films 105 and 107 with molten glass 109. The molten glass 109 filling up a space between the ferromagnetic metal thin films 105 and 107 or a gap spacer serves as a gap film forming the magnetic gap $g_1$ of the track width $Tw_1$ between the ferromagnetic metal thin films 105 and 107. The magnetic gap $g_1$ has a predetermined azimuth angle $\theta_1$ measured in a clockwise direction from a direction perpendicular to the direction of movement of the magnetic head.

Preferably, the azimuth angle $\theta_1$ is not less than 10° to suppress crosstalk between the magnetic gap $g_1$ of the magnetic head unit 102 and gap $g_2$ of the magnetic head unit 103. In this embodiment, the azimuth angle $\theta_1$ of the magnetic gap $g_1$ is 20°. When the magnetic head unit 102 is operated in an automatic tracking mode (ATF) in reproducing signals recorded on the track, the magnetic head unit 102 picks up signals recorded on the adjacent tracks. Accordingly, it is desirable that the track width $Tw_1$ of the magnetic gap $g_1$ is greater by a value in the range of 0 μm to 3 μm than the track pitch P of the tracks formed on the magnetic tape. If the track width $Tw_1$ of the magnetic gap $g_1$ is excessively large, crosstalk between the adjacent tracks is enhanced in reproducing the signals. Practically, the track pitch P is not greater than 10 μm and hence the track width $Tw_1$ of the magnetic gap $g_1$ is in the range of 10 μm to 13 μm. In this embodiment, the pitch P of tracks on the magnetic tape is 5 μm and the track width $Tw_1$ is 7 μm.

The construction of the other magnetic head unit 103 is the same as that of the magnetic head unit 102. The magnetic head unit 103 comprises a third half magnetic core 99 consisting of a magnetic core member 113 formed of a ferromagnetic oxide and a ferromagnetic metal thin film 114 formed on the magnetic core member 113, and a fourth half magnetic core 100 consisting of a magnetic core member 115 formed of a ferromagnetic oxide and a ferromagnetic metal thin film 116. The third half magnetic core 99 and the fourth half magnetic core 100 are joined together by bonding together the ferromagnetic metal thin films 114 and 116 with molten glass 117 so as to form the magnetic gap $g_2$ between the ferromagnetic metal thin films 114 and 116.

The opposite sides of a part of the magnetic core member 113 of the magnetic head unit 103, similarly to that of the magnetic head unit 102, are cut in recesses 118 and 119 and to form an elongate middle ridge 113b extending along the direction of movement of the magnetic head. The track width $Tw_2$ of the magnetic gap $g_2$ of the magnetic head unit 103 is defined by the recesses 118 and 119. The width of the middle ridge 113b is equal to the track width $Tw_2$ of the magnetic gap $g_2$. The extremity of the middle ridge 113b is inclined in a direction opposite to the direction of inclination of the middle ridge 104b at an angle equal to the azimuth angle $\theta_2$ of the magnetic gap $g_2$ with respect to the direction of movement of the magnetic head.

A recess 120, similar to recess 110 of the first half magnetic core 97, is formed in the surface of the magnetic core member 113 facing the fourth half magnetic core 100. The recess 120 has a first inclined surface 120a, a second inclined surface 120b and a third inclined surface 120c. The surface 113a of the back portion of the magnetic core member 113 of the fourth half magnetic core 100 is inclined, similarly to the surface 104a of the magnetic core member 104 of the first half magnetic core 97, substantially parallel to the second inclined surface 120b so as to decrease the thickness thereof with respect to the direction of movement of the magnetic head.

The magnetic core member 115 has a cross section substantially resembling a right triangle, and an inclined surface 115a put in close contact with inclined surface 113a of the magnetic core member 113 with its apex at a position corresponding to the middle portion of the recess 120. The width of the magnetic core member 115 is substantially equal to the track width $Tw_2$ of the magnetic gap $g_2$.

The ferromagnetic metal thin films 114 and 116 are formed on the magnetic core members 113 and 115 by deposition of a ferromagnetic metal in a vacuum thin film forming process. The ferromagnetic metal thin film 114 is formed only on the first inclined surface 120a of the recess 120 of the magnetic core member 113 of the third half magnetic core 99. The ferromagnetic metal thin film 116 is formed on the surface 115b opposite the inclined surface 115a of the magnetic core member 115 of the fourth half magnetic core 100 so as to extend between the contact surface 108 and the back surface 115c of the magnetic core member 115.

The third half magnetic core 99 and the fourth half magnetic core 100 are joined together with portions of the ferromagnetic metal thin films 114 and 116 on the side of contact surface 108 abutting each other and with magnetic core members 113 and 115 in close contact with each other by filling up a space between ferromagnetic metal thin films 114 and 116 with molten glass 117 to form the magnetic head unit 103. In magnetic head unit 103, similarly to the magnetic head unit 102, the magnetic gap $g_2$ of the track width $Tw_2$ is formed between the ferromagnetic metal thin films 114 and 116. The magnetic gap $g_2$ is inclined in a reverse direction to the inclination of the magnetic gap $g_1$ at an angle equal to the azimuth angle $\theta_2$ thereof. The azimuth angle $\theta_2$ of the magnetic gap $g_2$ is equal to the azimuth angle $\theta_1$ of the magnetic gap $g_1$.

The magnetic head units 102 and 103 are bonded together by a nonmagnetic material 101 with the ferromagnetic metal thin films 107 and 116 facing each other to form a double-azimuth magnetic head having the magnetic gaps $g_1$ and $g_2$ with different azimuth angles $\theta_1$ and $\theta_2$. The magnetic head units 102 and 103 are disposed in a stepped arrangement with respect to a direction along which tracks are arranged with a step DA equal to the track pitch P of tracks on a magnetic tape 89 (FIG. 10) between the magnetic gaps $g_1$ and $g_2$. The step DA is the distance between the respective ends of the magnetic gaps $g_1$ and $g_2$ of the magnetic head units 102 and 103 with respect to the direction of the width of the tracks on the side of the lower end.

Since the track pitch P of tracks on the magnetic tape 89 is 5 μm or less, the step DA is 5 μm or less. In this embodiment, both the track pitch P and the step DA are 5 μm. Since the respective track widths $Tw_1$ and $Tw_2$ of the magnetic head units 102 and 103 are 7 μm, a region in which signals are recorded by the preceding magnetic head unit 103 and a region in which signals are recorded by the succeeding magnetic head unit 102 overlap each other.

The gap distance GL between the respective magnetic gaps $g_1$ and $g_2$ of magnetic head units 102 and 103 with respect to the direction of movement of the magnetic head is shorter than the sum of the step D between tracks 91 and 92 and length L of interblock gap regions 91d, 91e, 92d and 92e formed respectively between video signal regions 91a and 92a and audio signal regions 91b, 91c, 92b and 92c of tracks 91 and 92 on the magnetic tape 89. The interblock regions 91d, 91e, 92d and 92e are the same as those mentioned in the description of the first embodiment. The gap distance GL is the center distance between the magnetic gaps $g_1$ and $g_2$ of the magnetic head units 102 and 103.

The gap distance GL is determined taking into consideration after-recording; for example, when the length of the interblock gap regions 91d, 91e, 92d and 92e are 250 μm, the gap distance GL is about 200 μm. Also taken into consideration in determining the gap distance GL are securing the video signal regions 91a and 92a for extended recording and reproducing, and forming the half magnetic cores 106 and 115 with a sufficiently large sectional area for sufficiently high head efficiency.

The magnetic head thus constructed is attached to the rotary drum of a video tape recorder. The rotary drum is rotated to record signals in a tape format as shown in FIG. 10 on the magnetic tape 80 moving along the circumference of the rotary drum relative to the magnetic head by the magnetic head. Since the pair of magnetic gaps $g_1$ and $g_2$ are arranged at the gap distance GL with respect to the direction of movement of the magnetic head shorter than the sum of step D between adjacent tracks and the length L of the interblock regions 91*d*, 91*e*, 92*d* and 92*e* between the video signal regions 91*a* and 92*a* and the audio signals 91*b*, 91*c*, 92*b* and 92*c*, satisfactory after-recording is possible.

The after-recording of audio signals can be achieved without disturbing the picture by starting the recording of the audio signals when the preceding magnetic gap $g_2$ is at the front end of the first audio signal region 91*b* and the succeeding magnetic gap $g_1$ is in the interblock gap region 92*d* between the video signal region 92*a* and the first audio signal region 92*b*. Thus, satisfactory after-recording is possible.

The magnetic head of the second embodiment is capable, similarly to the magnetic head of the first embodiment, of satisfactory after-recording in the tape format as shown in FIG. 11.

Since the magnetic head integrally provided with the pair of magnetic gaps $g_1$ and $g_2$ respectively having different azimuth angles $\theta_1$ and $\theta_2$ operates for simultaneous recording and reproducing, extended digital video signal recording and reproducing can be achieved without increasing the bit error rate even if the signals are recorded at a recording density of $5 \times 10^5$ bits/mm$^2$ on an 8 mm magnetic tape.

For example, if two magnetic heads respectively having different azimuth angles are disposed diametrically opposite to each other on a rotary drum, and signals are recorded on the 8 mm magnetic tape 89 at a recording density of $5 \times 10^5$ bits/mm$^2$, an abnormal track pattern occurs due to the eccentricity of the rotary drum or the like, in which a track formed by the preceding magnetic head and a track formed by the succeeding magnetic head overlap each other. Consequently, part of the signals recorded by the preceding magnetic head is erased, sufficiently high output is unavailable and the bit error rate increases greatly. On the other hand, since the magnetic head in the second embodiment of the present invention is formed by integrally combining the two magnetic head units 102 and 103 in a predetermined positional relation by the nonmagnetic material 101, recording tracks 91 and 92 are formed by the magnetic head units 102 and 103 are inclined in the same direction and do not overlap each other even if the rotary drum is eccentric. Therefore, sufficiently high output is available and the bit error rate remains low.

Figure 17:
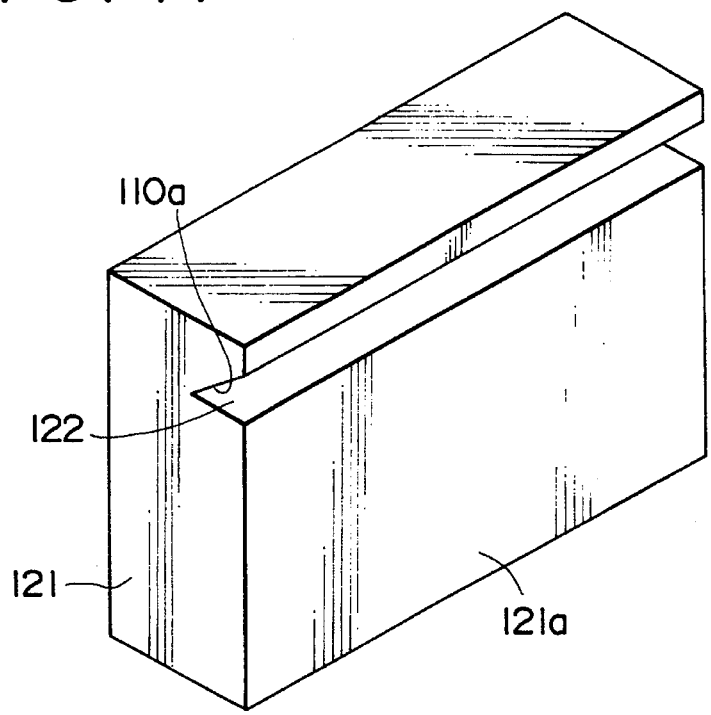
FIG. 17 is a perspective view that depicts a groove forming process in a method of fabricating the magnetic head of FIG. 15.

The magnetic head is fabricated by the following process. First, as shown in FIG. 17, a groove 122 having a cross section substantially resembling the letter V and having the inclined surface 110*a* of the recess 110 is formed in a major surface 121*a* of a Mn—Zn ferrite block 121 through the entire length of Mn—Zn ferrite block 121 by machining.

Figure 18:
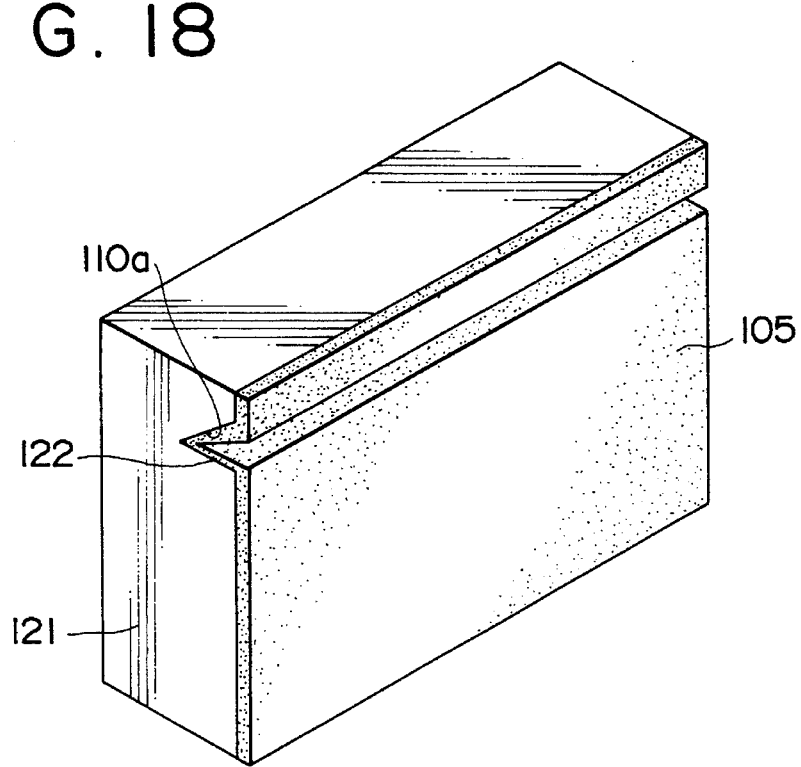
FIG. 18 is a perspective view that depicts a ferromagnetic metal thin film forming process in the method of fabricating the magnetic head of FIG. 15.

Then, as shown in FIG. 18, the ferromagnetic metal thin film 105 is formed by sputtering over the entire surface of the major surface 121*a* of the block 121 including the surfaces of the groove 122.

Figure 19:
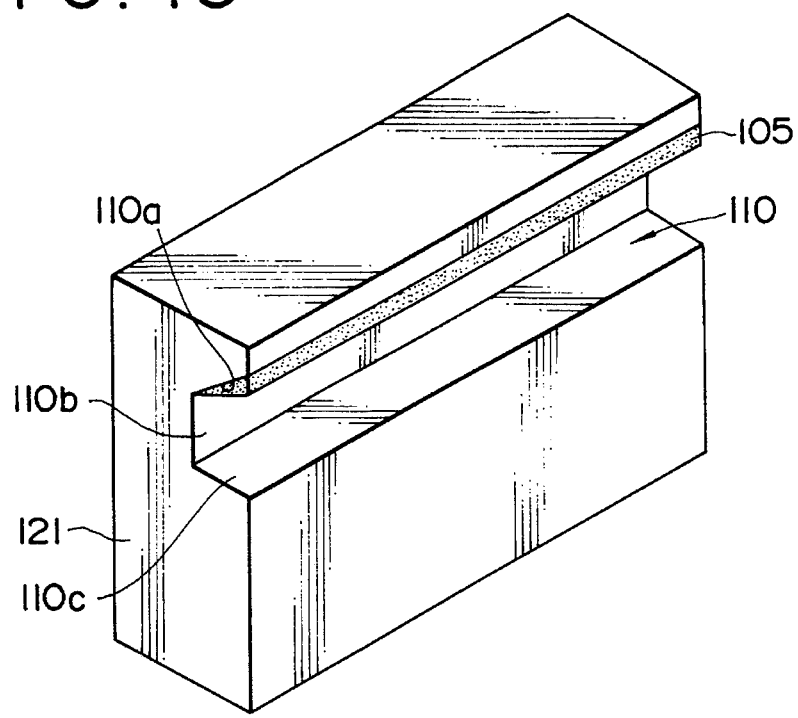
FIG. 19 is a perspective view that depicts a coil winding groove forming process in the method of fabricating the magnetic head of FIG. 15.

Then, as shown in FIG. 19, the ferromagnetic metal thin film 105 formed on the major surface 121*a* of the block 121 is removed by surface grinding, leaving part of the ferromagnetic metal thin film covering the surfaces of the groove 122. Consequently, only the first inclined surface 110*a* of the groove 122 is coated with the ferromagnetic metal thin film 105.

Then groove 122 is ground to form the second inclined surface 110*b* and the third inclined surface 110*c* to complete recess 110 which has a substantially rectangular cross section. This grinding is performed without grinding away the ferromagnetic metal thin film 105 formed on the first inclined surface 110*a*.

Then groove 122 is ground to form the second inclined surface 110*b* and the third inclined surface 110*c* to complete the recess 110 having a substantially rectangular cross section.

Figure 20:
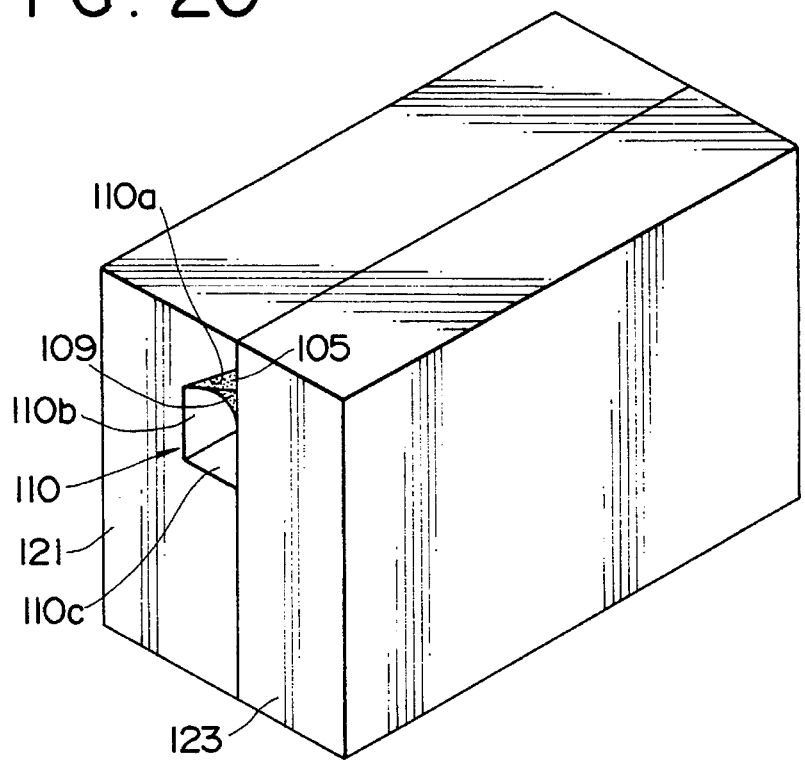
FIG. 20 is a perspective view that depicts a block joining process in the method of fabricating the magnetic head of FIG. 15.
Figure 21:
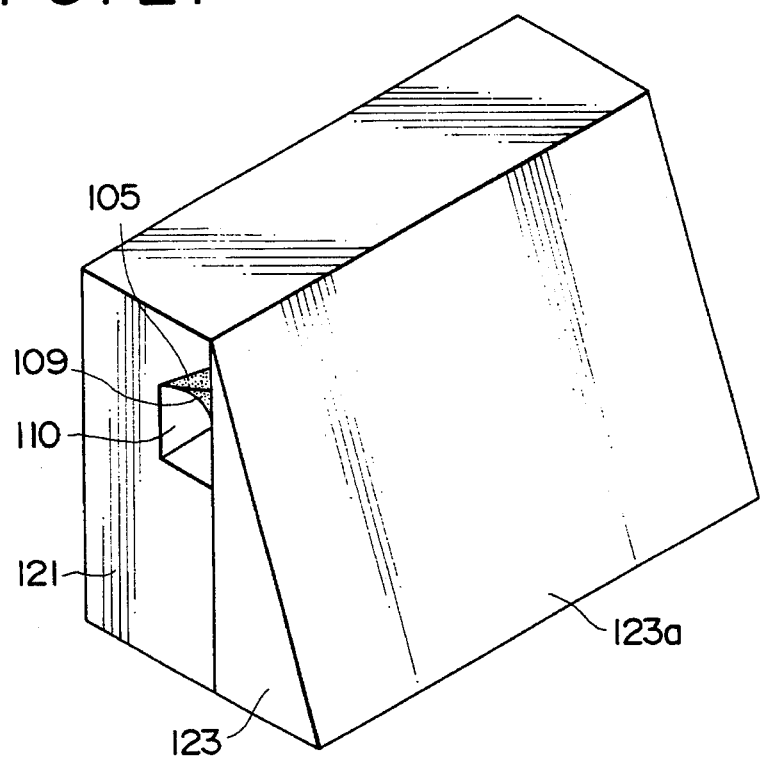
FIG. 21 is a perspective view that depicts a block cutting process in the method of fabricating the magnetic head of FIG. 15.

Then, as shown in FIG. 20, a Mn—Zn ferrite block 123 having substantially the same dimensions as that of the block 121 and not provided with any groove is bound together with block 121 by molten glass 109 and then, as shown in FIG. 21, the block 123 is machined to form a surface 123*a* inclined to the surface of the block 123 abutting on the block 121.

Figure 22:
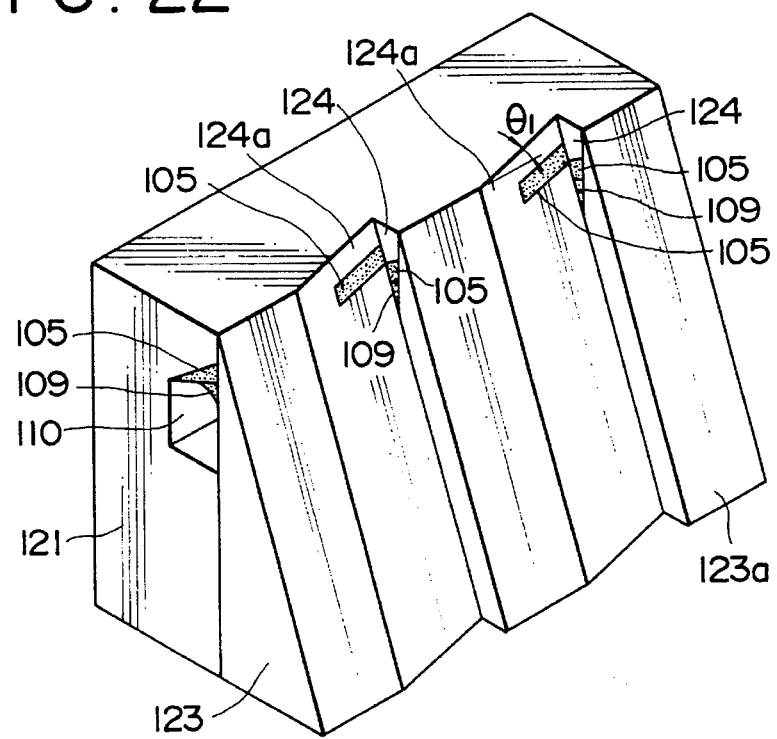
FIG. 22 is a perspective view that depicts an azimuth determining groove forming process in the method of fabricating the magnetic head of FIG. 15.
Figure 23:
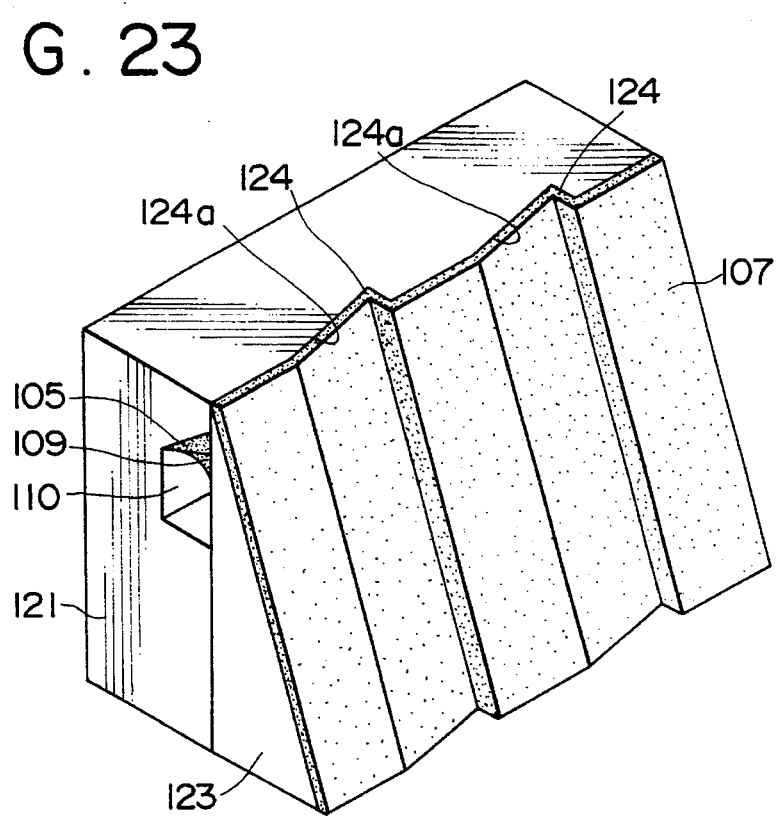
FIG. 23 is a perspective view of the ferromagnetic metal thin film forming process in the method of fabricating the magnetic head of FIG. 15.

Then, as shown in FIG. 22, a plurality of azimuth determining grooves 124 are formed by machining so as to extend in a direction perpendicular to the recess 110 in the inclined surface 123*a* of the block 123. The number of the azimuth determining grooves 124 corresponds to the number of magnetic heads to be fabricated. Each of the azimuth determining grooves 124 has an inclined surface 124*a* inclined to the inclined surface 123 at an angle equal to the azimuth angle $\theta_1$ of the magnetic head unit 102 to be fabricated. Consequently, a part of the ferromagnetic metal thin film 105 formed on the block 121, and the molten glass 109 are exposed in the inclined surface 124*a*.

Then, a nonmagnetic film, not shown, which serves as a gap spacer, is formed over the entire area of the inclined surface 123*a* of the block 123 including the surfaces of azimuth determining grooves 124, and the ferromagnetic metal thin film 107 is formed over the entire area of the nonmagnetic film. Thus the ferromagnetic metal thin film 105 exposed in the inclined surfaces 124*a* and the ferromagnetic metal thin film 107 are joined together by the nonmagnetic film to form the magnetic gap $g_1$.

Figure 24:
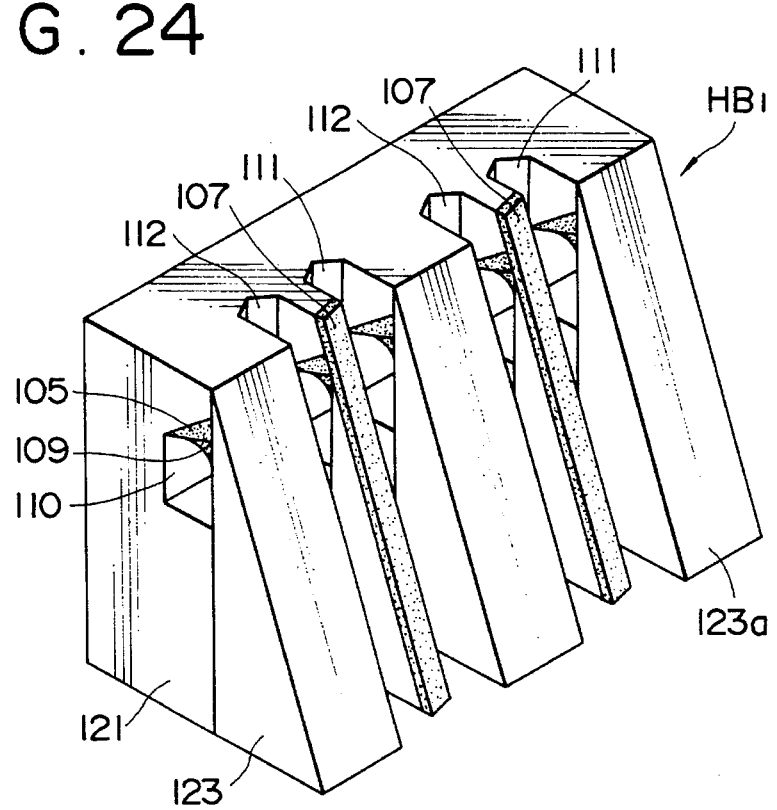
FIG. 24 is a perspective view that depicts a carved block forming process in the method of fabricating the magnetic head of FIG. 15.

Then, as shown in FIG. 24, the recesses 111 and 112 for defining track width are formed by machining along at least part of the azimuth determining grooves 124. The magnetic gaps $g_1$ formed by joining the ferromagnetic metal thin films 105 and 107 can be formed in the track width Tw$_1$ with great accuracy, because the recesses 111 and 112 are formed by machining after joining the ferromagnetic metal thin films 105 and 107.

Then, the nonmagnetic film and part of the ferromagnetic metal thin film 107 formed over the inclined surface 123*a* of the block 123 are removed completely to expose the inclined surface 123*a*. Consequently, the ferromagnetic metal thin film 107 remains only on the middle ridges 104*b* between the recesses 111 and 112. Thus, a magnetic head block HB$_1$ for the magnetic head unit 102 is fabricated.

Another magnetic head block HB$_2$, having an azimuth angle of $\theta_2$ reversed with respect to the azimuth angle $\theta_1$ is fabricated by the same process,.

The magnetic head block HB$_2$ has a ferromagnetic metal thin film, not shown, formed on a Mn—Zn ferrite block 125, and a ferromagnetic metal thin film 116 formed on another block, not shown, and joined to the ferromagnetic metal thin film of the block 125. The magnetic head block HB$_2$ is provided with the recesses 118 and 119 defining the track width $Tw_2$ of the magnetic gaps $g_2$ of the magnetic head units 103.

Figure 25:
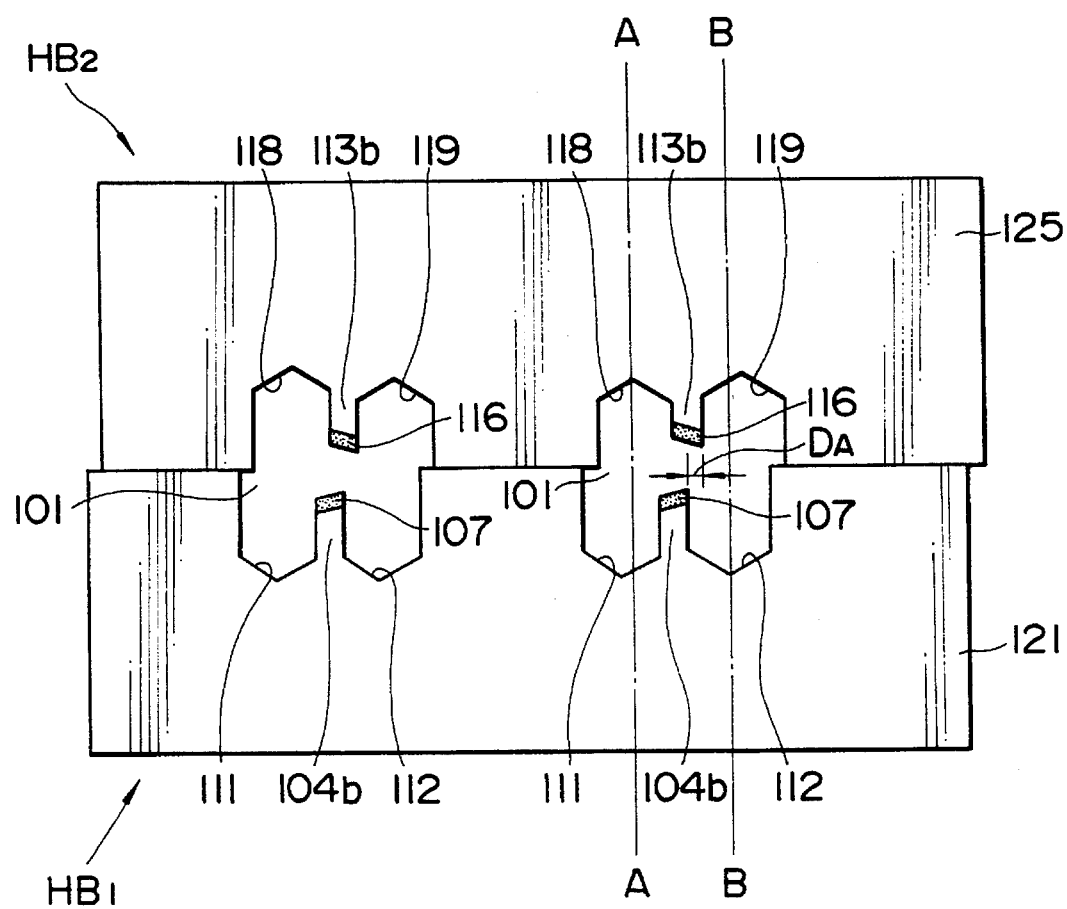
FIG. 25 is a plan view that depicts a block joining process in the method of fabricating the magnetic head of FIG. 15.

Then, as shown in FIG. 25, the magnetic head blocks $HB_1$ and $HB_2$ are combined with the magnetic gaps $g_1$ of the magnetic head block $HB_1$ and the magnetic gaps $g_2$ of the magnetic head block $HB_2$ displaced relative to each other in the direction of arrangement of tracks by the step DA (5 μm), and then, spaces defined by the opposite recesses 111 and 118 and the opposite recesses 112 and 119 are filled up with the nonmagnetic material 101, such as molten glass, to bond the magnetic head blocks $HB_1$ and $HB_2$ together.

The bonded magnetic head blocks $HB_1$ and $HB_2$ are cut along planes indicated by lines A—A and B—B in FIG. 25 to obtain magnetic head chips. The surfaces of the magnetic head chips are ground cylindrically so that the ferromagnetic metal thin films 107 and 116 are exposed in the contact surfaces 108 to complete the magnetic heads as shown in FIGS. 15 and 16.

Third Embodiment

A magnetic head according to a third embodiment according to the present invention has a pair of thin-film magnetic head units fabricated on a substrate by a vacuum thin film forming process. The pair of thin-film magnetic head units are arranged on the substrate in a stepped arrangement with a step equal to the pitch of tracks formed on a magnetic recording medium with respect to a direction along which tracks are arranged and with a gap distance with respect to the direction of movement of the magnetic head shorter than the sum of the step between adjacent tracks and the length of interblock gap regions formed between video signal regions and audio signal regions on the magnetic recording medium to permit extended digital video signal recording and reproducing operation.

Figure 26:
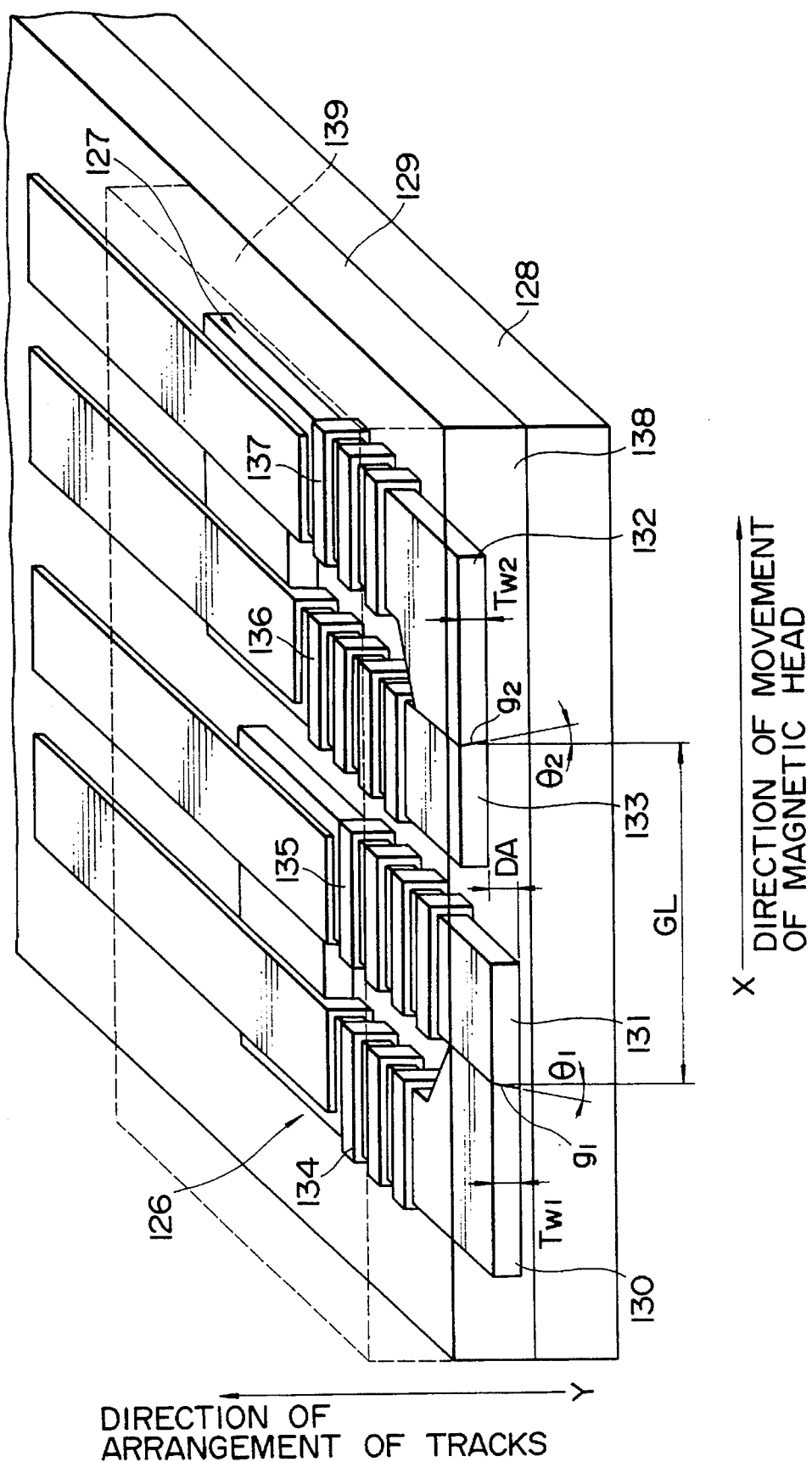
FIG. 26 is a perspective view of a magnetic head unit provided with a pair of thin-film magnetic heads for digital recording.

Referring to FIG. 26, the magnetic head, similarly to those in the first and second embodiments, has a pair of thin-film film magnetic head units 126 and 127 respectively having different azimuth angles $\theta_1$ and $\theta_2$ formed by a vacuum thin film forming process on a substrate 128 formed of a nonmagnetic material, such as $Al_2O_3$—TiC in a stepped arrangement with respect to a direction indicated by the arrow Y along which tracks are arranged with a step DA. The step DA is equal in height to the pitch P of tracks formed by the thin-film magnetic head units 126 and 127 on a magnetic tape 89 as shown in FIG. 10. The height of step DA is determined by the thickness of an insulating film 129 formed over the substrate 128 for magnetically insulated the pair of thin-film magnetic head units 126 and 127 and for securing satisfactory sliding contact between the magnetic head and the magnetic tape 89. The height of step DA is equal to those of the DAs in the first and second embodiment.

The gap distance GL of the magnetic head, namely, the distance between the magnetic gaps of the thin-film magnetic head units 126 and 127 with respect to the direction of movement of the magnetic head indicated by the arrow X in FIG. 26, is shorter than the sum of step D between tracks 91 and 92 and length L of the interblock gap regions 91d, 91e, 92d and 92e formed respectively between the video signal regions 91a and 92a and the audio signal regions 91b, 91c, 92b and 92c of recording tracks 91 and 92 on the magnetic tape 89, The gap distance GL is equal to gap distances GL in the first and second embodiments.

Accordingly, the magnetic gap $g_1$ of the succeeding magnetic head unit 126 is in the interblock gap region 91d between the video signal region 91a and the first audio signal region 91b when the magnetic gap $g_2$ of the preceding thin-film magnetic head unit 127 is at the front end of the first audio signal region 92b. In this state, audio signals can be recorded for after-recording without disturbing the picture. This magnetic head is able to achieve satisfactory after-recording also in the tape format shown in FIG. 11. Since the pair of thin-film magnetic head units 126 and 127 formed on the substrate 128 operate for simultaneous recording and reproducing, extended recording and reproducing of digital video signals are possible without increasing the bit error rate due to an abnormal track pattern when signals are recorded at a recording density of $5 \times 10^5$ bits/$mm^2$ even if the width of the magnetic tape 89 is 8 mm or less.

Incidentally, the thin-film magnetic head units 126 and 127 have a bulk type magnetic head construction employed in video tape recorders and the like, which is different from a magnetic head construction employed in hard disk drives. Units 126 and 127 are made by forming an upper magnetic member on a gap film formed on a lower magnetic member and winding a conductor in a spiral coil.

The thin-film magnetic head unit 126 (127) is formed by placing a first thin-film magnetic core member 130 (132) and a second thin-film magnetic core member 131 (133) opposite to each other with a gap film, not shown, therebetween, and winding conductors in helical coils 134 and 135 (136 and 137) respectively around the first thin-film magnetic core member 130 (132) and the second thin-film magnetic core member 131 (133). The magnetic gaps $g_1$ and $g_2$ formed in the contact surface 138 have different azimuth angles $\theta_1$ and $\theta_2$, respectively, to suppress crosstalk between the magnetic gaps $g_1$ and $g_2$. The respective track widths $Tw_1$ and $Tw_2$ of the magnetic gaps $g_1$ and $g_2$ are larger than the pitch P of tracks on the magnetic tape 80 by a value in the range of 0 μm to 3 μm in view of automatic tracking. The thin-film magnetic core members 130, 131, 132 and 133 and the helical coils 134, 135, 136 and 137 wound around the thin-film magnetic core members 130, 131, 132 and 133 of the magnetic head are covered with a protective film 139 to protect the magnetic circuit.

The respective track widths $Tw_1$ and $Tw_2$ of the magnetic gaps $g_1$ and $g_2$ are dependent on the thickness of the thin-film magnetic core members 130, 131, 132 and 133, which are more advantageous in dealing with narrow tracks than the bulk type magnetic heads in the first and second embodiments, and the magnetic head units 126 and 127 can be formed in a highly accurate positional relation. Since the helical coils 134, 135, 136 and 137 formed by a thin-film forming process have a dc resistance smaller than that of spiral coils, noise is reduced significantly.

The magnetic head of the third embodiment is fabricated by the following process. Since the thin-film magnetic head units 126 and 127 are the same in construction, only a process for fabricating the thin-film magnetic head unit 126 will be described.

Figure 27:
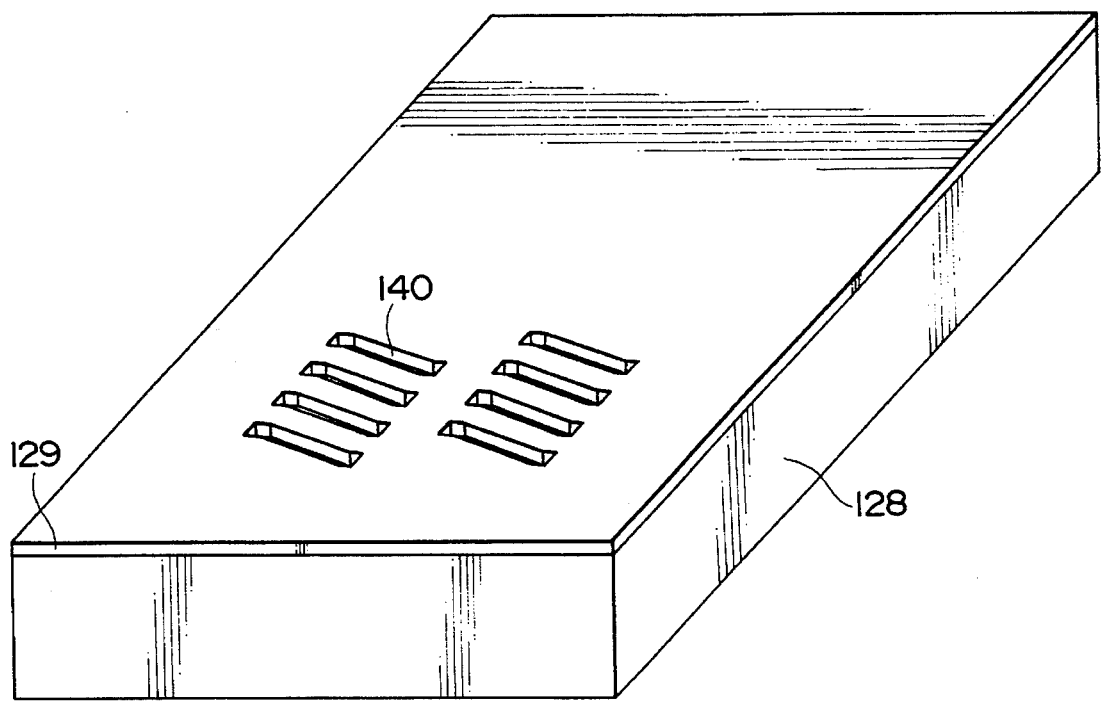
FIG. 27 is a perspective view that depicts a groove forming process in a method of fabricating the head unit of FIG. 26.

Referring to FIG. 27, an insulating film 129, such as $SiO_2$ film, for facing the surface of the substrate 128 is formed over substrate 128 by sputtering. Substrate 128 is formed of a nonmagnetic material, such as potassium titanate, barium titanate or $Al_2O_3$—TiC. The thickness of the insulating film 129 corresponds to the thickness of a lower conductive thin film for forming the lower conductors of the helical coils.

Slots 140 in which the lower conductors of the helical coils are to be formed are formed at a predetermined pitch through the insulating film 129 by a photolithographic process and an etching process, such as a reactive ion etching (RIE) process or an ion etching process. The number of the slots 140 in each row is equal to the number of turns of the helical coil.

Figure 28:
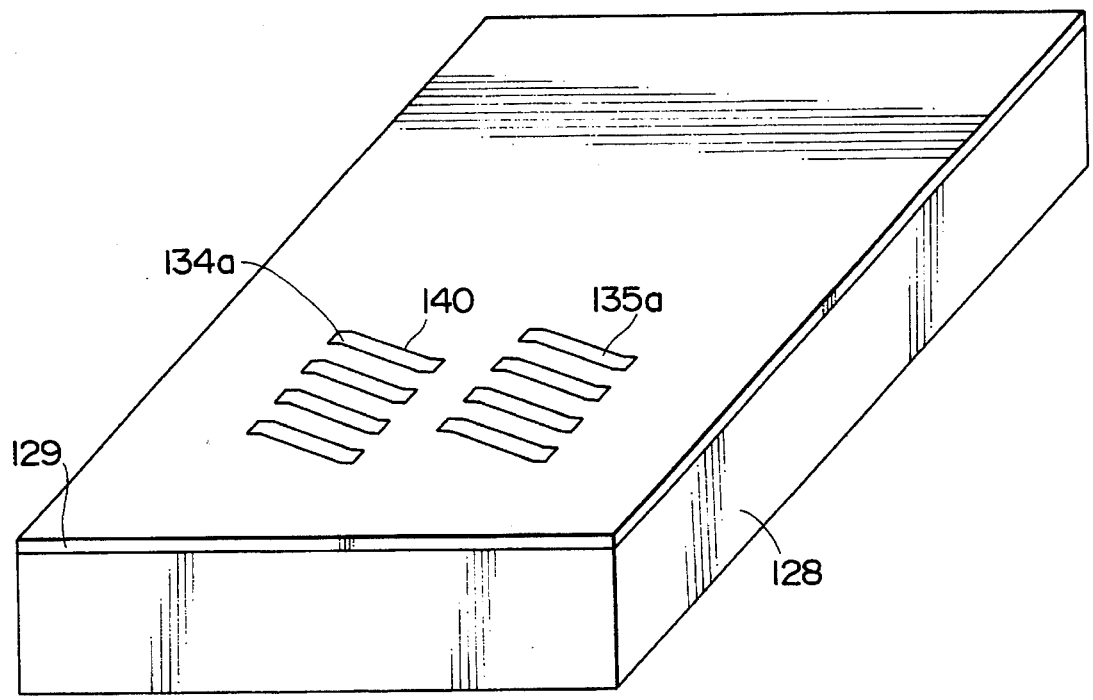
FIG. 28 is a perspective view that depicts a lower conductive thin film forming process in the method of fabricating the magnetic head unit of FIG. 26.

Then, a conductive film, such as Cu film or an Al film is formed in a thickness greater than the depth of the slots 140 over the entire area of the substrate 128 including the slots 140 by a thin-film forming process, such as a sputtering process or a plating process, and then the surface of the conductive film is finished in a smooth surface by lapping or the like to form the lower thin-film conductors 134a and 135a in the slots 140 as shown in FIG. 28.

Figure 29:
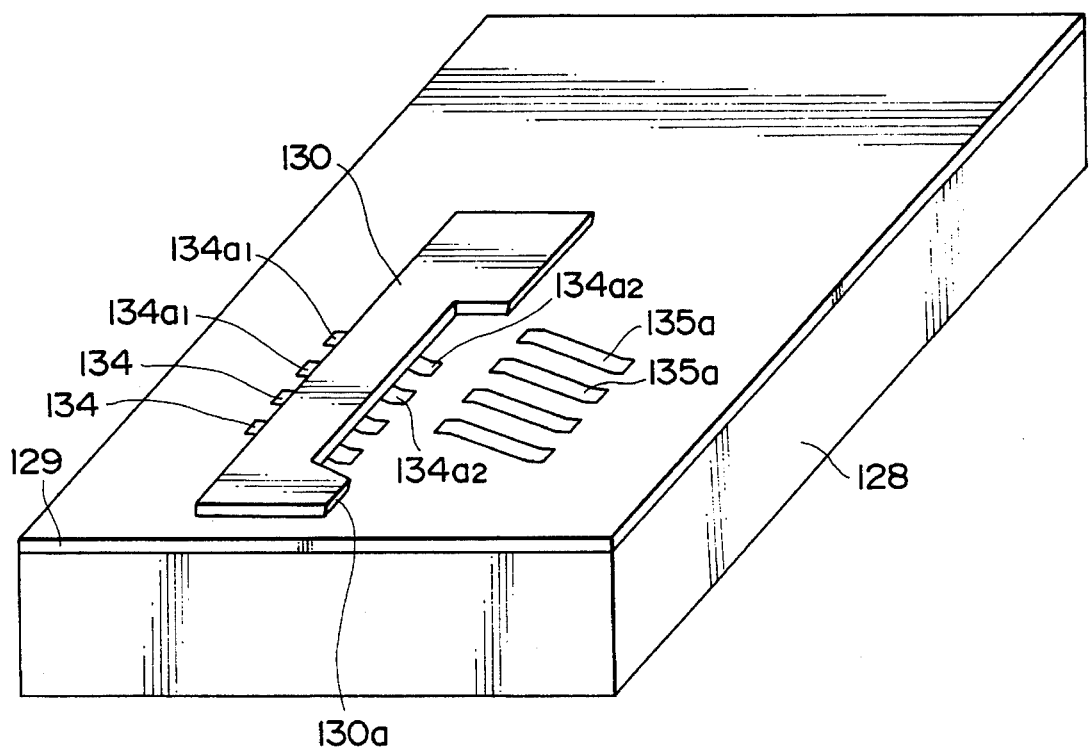
FIG. 29 is a perspective view that depicts a first thin-film magnetic core forming processing in the method of fabricating the magnetic head unit of FIG. 26.

Then, an insulating film, not shown, such as $SiO_2$ film or an $Al_2O_3$ film, for insulating the thin-film magnetic core members from the lower thin-film conductors 134a and 135a is formed over the entire area of the substrate 128. A ferromagnetic metal thin film, such as a Sendust film or an amorphous alloy film, is formed over the insulating film, and then the ferromagnetic metal thin film is patterned to form the first thin-film magnetic core member 130 as shown in FIG. 29.

In forming the first thin-film magnetic core member 130, the ferromagnetic metal thin film is formed in a thickness greater than a desired track width, namely, in a thickness corresponding to the sum of the desired track width and a grinding allowance, and then the ferromagnetic metal thin film is formed substantially in a U-shape by etching so that a gap forming surface 130a is formed in a sufficiently high surface accuracy and at a desired azimuth angle. The first thin-film magnetic core member 130 is formed so as to extend across the lower thin-film conductors 134a arranged in a row and the opposite ends $134a_1$ and $134a_2$ of the lower thin-film conductors 134a protrude from opposite sides of the first thin-film magnetic core member 130. Then, a gap film, not shown, such as a $SiO_2$ film is formed on the gap forming surface 130a of the first thin-film magnetic core member 130.

Figure 30:
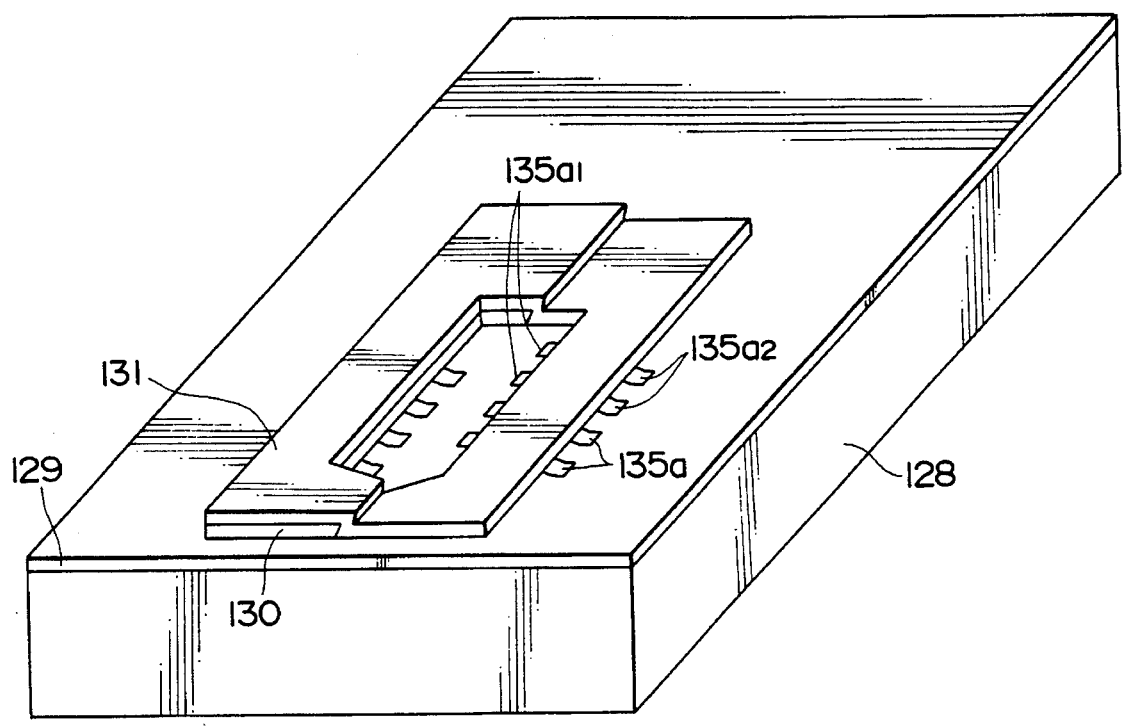
FIG. 30 is a perspective view that depicts a second thin-film magnetic core forming process in the method of fabricating the magnetic head unit of FIG. 26.

Then, a ferromagnetic metal thin film, such as a Sendust film, is formed over the entire area of the surface of the substrate 128, and a second thin-film magnetic core member 131 is formed by a photolithographic process. The second thin-film magnetic core member 131 is spread over the first thin-film magnetic core member 130. As shown in FIG. 30, the second thin-film magnetic core member 131 is formed so as to extend across the lower thin-film conductors 135a and the opposite ends $135a_1$ and $135a_2$ of the lower thin-film conductors 135a protrude from the opposite side of the second thin-film magnetic core member 131. The thickness of the second thin-film magnetic core member 131 is equal to that of the first thin-film magnetic core member 130.

Then, windows are formed in the insulating film extending between the first thin-film magnetic core member 130 and the second thin-film magnetic core member 131, and the lower thin-film conductors 134a and 135a to expose the opposite ends $134a_1$, $134a_2$, $135a_1$ and $135a_2$ of the lower thin-film conductors 134a and 135a. Then, as shown in FIG. 31, side thin-film conductors 134b and 135b for connecting the lower thin-film conductors 134a and 135a to upper thin-film conductors, respectively, which are formed later, are formed on the opposite ends $134a_1$, $134a_2$, $135a_1$ and $135a_2$ of the lower thin-film conductors 134a and 135a, respectively.

The side thin-film conductors 134b and 135b are formed by a pattern plating process or by subjecting a conductive film, such as a Cu film or an Al film formed over substrate 128 to a photolithographic process and an etching process. The thickness of the side thin-film conductors 134b and 135b is approximately equal to that of the first thin-film magnetic core member 130 and the second thin-film magnetic core member 131.

Figure 32:
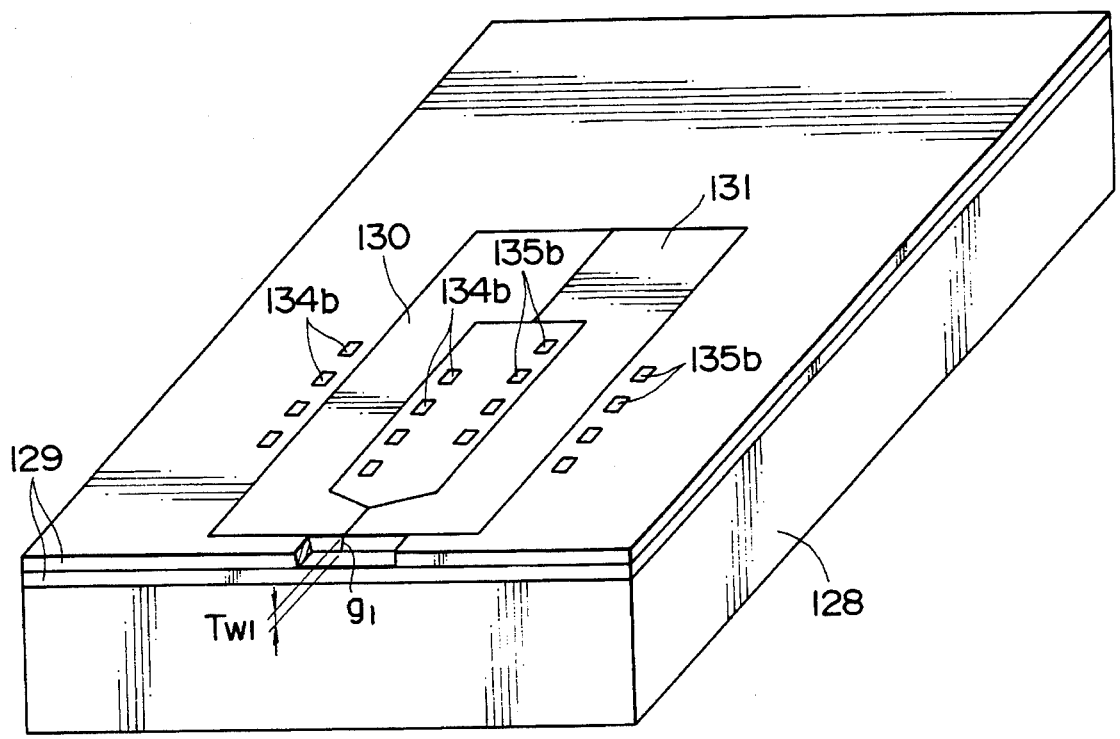
FIG. 32 is a perspective view that depicts a flattening process in the method of fabricating the magnetic head unit of FIG. 26.
Figure 33:
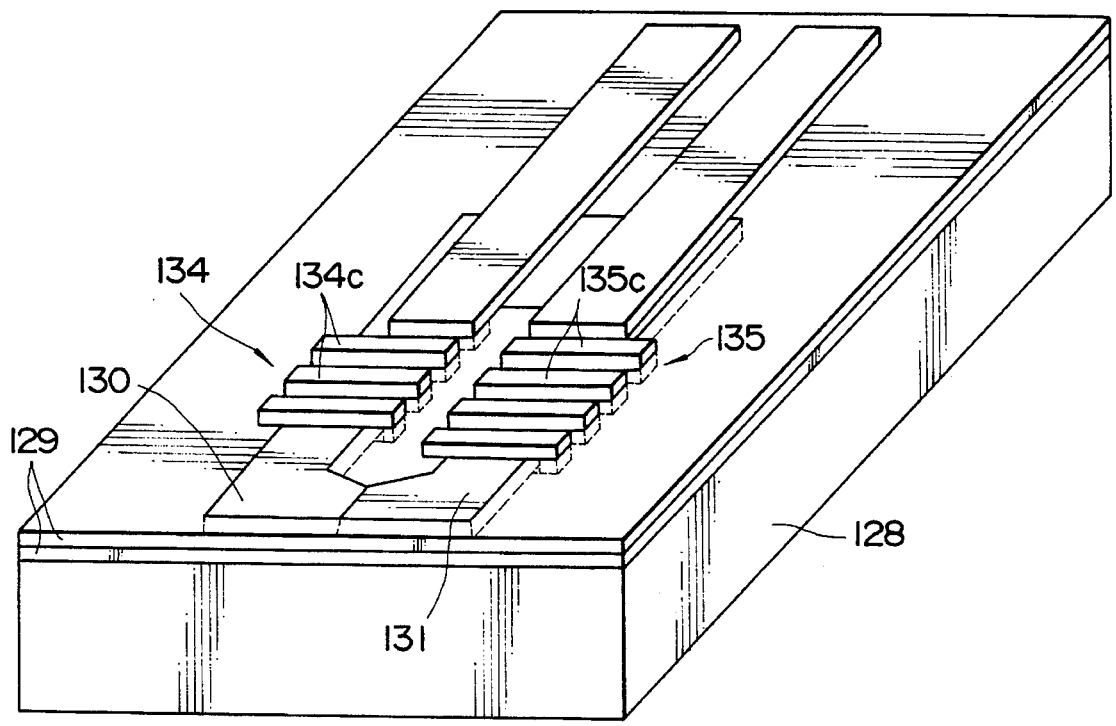
FIG. 33 is a perspective view that depicts an upper conductive thin film forming process in the method of fabricating the magnetic head unit of FIG. 26.

Then, as shown in FIG. 32, an insulating film 129, such as $SiO_2$ film, is formed in a thickness greater than that of the first thin-film magnetic core member 130 over the entire area of the substrate 128 by a thin-film forming process such as a CVD (chemical vapor deposition) process or a sputtering process. Then, the work is subjected to a lapping process to finish the first thin-film magnetic core member 130 and the second thin-film magnetic core member 131 in a thickness equal to a predetermined track width $Tw_1$.

Thus, a closed magnetic path is formed by the first thin-film magnetic core member 130 and the second thin-film magnetic core member 131, and a magnetic gap $g_1$ of an azimuth angle $\theta_1$ is formed at the junction of the first thin-film magnetic core member 130 and the second thin-film magnetic core member 131. The track width $Tw_1$ is determined by the thickness of the first thin-film magnetic core member 130 and the second thin-film magnetic core member 131.

Then, a conductive film for forming the upper thin-film conductors 134c and 135c, such as a Cu film or an Al film, is formed over the entire area of the substrate 128 by sputtering or the like, and the conductive film is patterned by a photolithographic process and an etching process to form the upper thin-film conductors 134c and 135c so as to be electrically connected to the side thin-film conductors 134b and 134c and to extend across the first thin-film magnetic core member 130 and the second thin-film magnetic core member 131, respectively. The rearmost upper thin-film conductors 134c and 135c are extended backward to form external terminals. Thus, the helical coils 134 and 135 are wound helically around the first thin-film magnetic core member 130 and the second thin-film magnetic core member 131 forming a closed magnetic path.

Then, an insulating film 129 is formed over the thin-film magnetic head unit 126, and the surface of the insulating film 129 is flattened. In flattening the insulating film 129, the thickness of the insulating film 129 is adjusted so that the thin-film magnetic head unit 126 and the thin-film magnetic head unit 127, which is formed later, are disposed in a stepped arrangement with respect to the direction of arrangement of tracks of a magnetic tape 89 with a step DA equal to the pitch P of the tracks.

Then, the thin-film magnetic head unit 127 is fabricated by the same process so that the gap distance GL between the thin-film magnetic head units 126 and 127 is shorter than the sum of the step D between the tracks and the length L of interblock gap regions 91d, 91e, 92d and 92e formed between video signal regions 91a and 92a and audio signal regions 91b, 91c, 92b and 92c on the tracks, respectively. Then, the magnetic circuit thus formed is covered with a protective film 139 and the contact surface 138 is ground so that the magnetic gaps $g_1$ and $g_2$ are exposed to complete the magnetic head.

The magnetic head thus fabricated may be provided additionally with an auxiliary core, not shown, for the magnetic connection of the first thin-film magnetic core member 130 and the second thin-film magnetic core member 131 after the process shown in FIG. 32 to further enhance magnetic head efficiency. The auxiliary core increases the sectional area of the back portion of the magnetic core to decrease its magnetic resistance, which improves magnetic head efficiency greatly.

As is apparent from the foregoing description, the magnetic head of the first aspect of the present invention has a pair of magnetic head chips disposed on the head base with the gap distance shorter than the sum of the step between tracks formed on the magnetic tape and the length of interblock gap regions between video signal regions and audio signal regions on the tape. Accordingly, the succeeding magnetic head chip is in the interblock gap region when the preceding magnetic head chip is at the front end of the audio signal region to start recording audio signals, and hence satisfactory after-recording can be achieved without disturbing a picture.

The magnetic head of the second aspect of the present invention compresses recording information without entailing distortion in reproduced signals, records channel-coded data on a magnetic recording tape, and a pair of magnetic head chips provided on a head base function for simultaneous recording and reproducing. Accordingly, extended recording and reproducing of digital video signals at a low bit error rate can be achieved even if signals are recorded on and reproduced from a narrow magnetic recording medium of 8 mm or less in width at a recording wavelength of 0.5 μm and a high recording density of $5 \times 10^5$ bits/mm$^2$ or higher and the track width of the magnetic head is 8 μm or less.

The magnetic head in the third aspect of the present invention is provided with a pair of magnetic gaps disposed at a gap distance shorter than the sum of the step between adjacent tracks formed on the magnetic tape and the length of interblock gap regions between video signal regions and audio signal regions on the tape. Accordingly, the succeeding magnetic gap is in the interblock gap region when the preceding magnetic gap is at the front end of the audio signal region to start recording audio signals, and hence satisfactory after-recording can be achieved without disturbing the picture.

The digital recording magnetic head of the fourth aspect of the present invention compresses recording information without entailing distortion in reproduced signals, records channel-coded data on a magnetic recording tape and the pair of magnetic gaps of different azimuth angles function for simultaneous recording and reproducing. Accordingly, extended recording and reproducing of digital video signals can be achieved at a low bit error rate even if signals are recorded on and reproduced from a narrow magnetic tape of 8 mm or below in width at a recording wavelength of 0.5 μm and a high recording density of $5 \times 10^5$ bits/mm$^2$ or above and the track width of the magnetic head is 8 μm or below.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. In a digital video tape recorder that records video and audio signals on a magnetic tape by means of a magnetic head that moves relative to said tape in a scanning direction to form successive slant tracks thereon while the tape is advanced so that adjacent tracks are displaced with respect to each other in said scanning direction by a step distance and are displaced with respect to each other in a transverse direction perpendicular to the scanning direction by a pitch distance, each track having a video signal region and an audio signal region which define therebetween an interblock gap, and said video signal region of each track is disposed in a leading position with respect to said audio signal region of said track; said magnetic head comprising:

a head base; and a pair of magnetic head chips disposed respectively at different azimuth angles on the head base and each having a respective magnetic gap;

said pair of magnetic head chips being displaced with respect to each other in said transverse direction by a distance that is substantially equal to said pitch distance, and the respective magnetic gaps being displaced with respect to each other in said scanning direction by a distance that is less than the sum of the length of said interblock gap and said step distance; and a leading one of said pair of magnetic head chips commencing scanning said audio signal region of a first track scanned by said leading one at a time that is after a time at which the other one of said pair of magnetic head chips has completed scanning of the video signal region of a second track that is adjacent to said first track, said first and second tracks being scanned substantially simultaneously by said pair of magnetic head chips.

2. In a digital video tape recorder that records video and audio signals on a magnetic tape by means of a magnetic head that moves relative to said tape in a scanning direction to form successive slant tracks thereon while the tape is advanced so that adjacent tracks are displaced with respect to each other in said scanning direction by a step distance and are displaced with respect to each other in a transverse direction perpendicular to the scanning direction by a pitch distance, each track having a video signal region and an audio signal region which define therebetween an interblock gap with no signal being recorded in said interblock gap; said magnetic head comprising:

a head base; and a pair of magnetic head chips disposed respectively at different azimuth angles on the head base and each having a respective magnetic gap;

said pair of magnetic head chips being displaced with respect to each other in said transverse direction by a distance that is substantially equal to said pitch distance, and the respective magnetic gaps being displaced with respect to each other in said scanning direction by a distance that is less than the sum of the length of said interblock gap and said step distance.

3. In a digital video tape recorder that records video and audio signals on a magnetic tape by means of a digital recording magnetic head that moves relative to said tape in a scanning direction to form successive slant tracks thereon while the tape is advanced so that adjacent tracks are displaced with respect to each other in said scanning direction by a step distance and are displaced with respect to each other in a transverse direction perpendicular to the scanning direction by a pitch distance, each track having a video signal region and an audio signal region which define therebetween an interblock gap, said video signal region of each track being disposed in a leading position with respect to said audio signal region of said track; the combination of means for separating input digital video signals into data blocks each consisting of a plurality of picture element data, means for compression coding the data blocks, and means for channel-coding the compression-coded data and supplying the resulting channel-coded data to said digital recording magnetic head which comprises:

a head base; and a pair of magnetic head chips disposed respectively at different azimuth angles on the head base and each having a respective magnetic gap;

said pair of magnetic head chips being displaced with respect to each other in said transverse direction by a distance that is substantially equal to said pitch distance and the respective magnetic gaps being displaced with respect to each other in said scanning direction by a distance that is less than the sum of the length of said interblock gap and said step distance; and a leading one of said pair of magnetic head chips commencing scanning said audio signal region of a first track scanned by said leading one at a time that is after a time at which the other one of said pair of magnetic head chips has completed scanning of the video signal region of a second track that is adjacent to said first track, said first and second tracks being scanned substantially simultaneously by said pair of magnetic head chips.

4. In a digital video tape recorder that records video and audio signals on a magnetic tape by means of a digital recording magnetic head that moves relative to said tape in a scanning direction to form successive slant tracks thereon while the tape is advanced so that adjacent tracks are displaced with respect to each other in said scanning direction by a step distance and are displaced with respect to each other in a transverse direction perpendicular to the scanning direction by a pitch distance, each track having a video signal region and an audio signal region which define therebetween an interblock gap, with no signal being recorded in said interblock gap; the combination of means for separating input digital video signals into data blocks each consisting of a plurality of picture element data, means for compression coding of the data blocks and means for channel-coding the compression-coded data and supplying the resulting channel-coded data to said digital recording magnetic head which comprises:

a head base; and a pair of magnetic head chips disposed respectively at different azimuth angles on the head base and each having a respective magnetic gap;

said pair of magnetic head chips being displaced with respect to each other in said transverse direction by a distance that is substantially equal to said pitch distance and the respective magnetic gaps being displaced with respect to each other in said scanning direction by a distance that is less than the sum of the length of said interblock gap and said step distance.

5. In a digital video tape recorder that records video and audio signals on a magnetic tape by means of a magnetic head that moves relative to said tape in a scanning direction to form successive slant tracks thereon while the tape is advanced so that adjacent tracks are displaced with respect to each other in said scanning direction by a step distance and are displaced with respect to each other in a transverse direction perpendicular to the scanning direction by a pitch distance, each track having a video signal region and an audio signal region which define therebetween an interblock gap, said video signal region of each track being disposed in a leading position with respect to said audio signal region of said track; said magnetic head comprising a pair of magnetic gaps having different azimuth angles;

said pair of magnetic gaps being displaced with respect to each other in said transverse direction by a distance that is substantially equal to said pitch distance, and being displaced with respect to each other in said scanning direction by a distance that is less than the sum of the length of said interblock gap and said step distance;

a leading one of said pair of magnetic gaps commencing scanning said audio signal region of a first track scanned by said leading one at a time that is after a time at which the other one of said pair of magnetic gaps has completed scanning of the video signal region of a second track that is adjacent to said first track, said first and second tracks being scanned substantially simultaneously by said pair of magnetic gaps.

6. In a digital video tape recorder that records video and audio signals on a magnetic tape by means of a magnetic head that moves relative to said tape in a scanning direction to form successive slant tracks thereon while the tape is advanced so that adjacent tracks are displaced with respect to each other in said scanning direction by a step distance and are displaced with respect to each other in a transverse direction perpendicular to the scanning direction by a pitch distance, each track having a video signal region and an audio signal region which define therebetween an interblock gap, with no signal recorded in said interblock gap; said magnetic head comprising a pair of magnetic gaps having different azimuth angles;

said pair of magnetic gaps being displaced with respect to each other in said transverse direction by a distance that is substantially equal to said pitch distance, and being displaced with respect to each other in said scanning direction by a distance that is less than the sum of the length of said interblock gap and said step distance.

7. In a digital video tape recorder that records video and audio signals on a magnetic tape by means of a digital recording magnetic head that moves relative to said tape in a scanning direction to form successive slant tracks thereon while the tape is advanced so that adjacent tracks are displaced with respect to each other in said scanning direction by a step distance and are displaced with respect to each other in a transverse direction perpendicular to the scanning direction by a pitch distance, each track having a video signal region and an audio signal region which define therebetween an interblock gap, with said video signal region of each track being disposed in a leading position with respect to said audio signal region of said track; the combination of means for separating input digital video signals into data blocks each consisting of a plurality of picture element data, means for compression coding the data blocks and means for channel-coding the compression-coded data and supplying the resulting channel-coded data to said digital recording magnetic head which comprises a pair of magnetic gaps having different azimuth angles; said pair of magnetic gaps being displaced with respect to each other in said transverse direction by a distance that is substantially equal to said pitch distance, and being displaced with respect to each other in said scanning direction by a distance that is less than the sum of the length of said interblock gap and said step distance; and a leading one of said pair of magnetic gaps commencing scanning said audio signal region of a first track scanned by said leading one at a time that is after a time at which the other one of said pair of magnetic gaps has completed scanning of the video signal region of a second track that is adjacent to said first track, said first and second tracks being scanned substantially simultaneously by said pair of magnetic gaps.

8. In a digital video tape recorder that records video and audio signals on a magnetic tape by means of a digital recording magnetic head that moves relative to said tape in a scanning direction to form successive slant tracks thereon while the tape is advanced so that adjacent tracks are displaced with respect to each other in said scanning direction by a step distance and are displaced with respect to each other in a transverse direction perpendicular to the scanning direction by a pitch distance, each track having a video signal region and an audio signal region which define therebetween an interblock gap, with no signal being recorded in said interblock gap; the combination of means for separating input digital video signals into data blocks each consisting of a plurality of picture element data, means for compression coding the data blocks and means for channel-coding the compression-coded data and supplying the resulting channel-coded data to said digital recording magnetic head which comprises a pair of magnetic gaps having different azimuth angles; said pair of magnetic gaps being displaced with respect to each other in said transverse direction by a distance that is substantially equal to said pitch distance, and being displaced with respect to each other in said scanning direction by a distance that is less than the sum of the length of said interblock gap and said step distance.

9. In a digital video tape recorder that records video and audio signals on a magnetic tape by means of a magnetic head that moves relative to said tape in a scanning direction to form successive slant tracks thereon while the tape is advanced so that adjacent tracks are displaced with respect to each other in said scanning direction by a step distance and are displaced with respect to each other in a transverse direction perpendicular to the scanning direction by a pitch distance, each track having an audio signal region followed in said scanning direction by a video signal region, said audio signal region having a trailing end and said video signal region having a leading end, said leading end of said video signal region being displaced by a gap distance in said scanning direction with respect to said trailing end of said audio signal region; said magnetic head comprising:

a head base; and a pair of magnetic head chips disposed respectively at different azimuth angles on the head base and each having a respective magnetic gap;

said pair of magnetic head chips being displaced with respect to each other in said transverse direction by a distance that is substantially equal to said pitch distance, and the respective magnetic gaps being displaced with respect to each other in said scanning direction by a distance that is less than the sum of said step distance and said gap distance;

a leading one of said pair of magnetic head chips commencing scanning of said video signal region of a first track scanned by said leading one at a time that is after a time at which the other one of said pair of magnetic head chips has completed after-recording of an audio signal in the audio signal region of a second track that is adjacent to said first track, said first and second tracks being scanned substantially simultaneously by said pair of magnetic head chips.

10. In a digital video tape recorder that records video and audio signals on a magnetic tape by means of a digital recording magnetic head that moves relative to said tape in a scanning direction to form successive slant tracks thereon while the tape is advanced so that adjacent tracks are displaced with respect to each other in said scanning direction by a step distance and are displaced with respect to each other in a transverse direction perpendicular to the scanning direction by a pitch distance, each track having an audio signal region followed in said scanning direction by a video signal region, said audio signal region having a trailing end and said video signal region having a leading end, said leading end of said video signal region being displaced by a gap distance in said scanning direction with respect to said trailing end of said audio signal region; the combination of means for separating input digital video signals into data blocks each comprised of a plurality of picture element data, means for compression coding the data blocks, and means for channel-coding the compression-coded data and supplying the resulting channel-coded data to said digital recording magnetic head which comprises:

a head base; and a pair of magnetic head chips disposed respectively at different azimuth angles on the head base and each having a respective magnetic gap;

said pair of magnetic head chips being displaced with respect to each other in said transverse direction by a distance that is substantially equal to said pitch distance, and the respective magnetic gaps being displaced with respect to each other in said scanning direction by a distance that is less than the sum of said step distance and said gap distance;

a leading one of said pair of magnetic head chips commencing scanning of said audio signal region of a first track scanned by said leading one at a time that is after a time at which the other one of said pair of magnetic head chips has completed after-recording of an audio signal in the audio signal region of a second track that is adjacent to said first track, said first and second tracks being scanned substantially simultaneously by said pair of magnetic head chips.

11. In a digital video tape recorder that records video and audio signals on a magnetic tape by means of a magnetic head that moves relative to said tape in a scanning direction to form successive slant tracks thereon while the tape is advanced so that adjacent tracks are displaced with respect to each other in said scanning direction by a step distance and are displaced with respect to each other in a transverse direction perpendicular to the scanning direction by a pitch distance, each track having an audio signal region followed in said scanning direction by a video signal region, said audio signal region having a trailing end and said video signal region having a leading end, said leading end of said video signal region being displaced by a gap distance in said scanning direction with respect to said trailing end of said audio signal region; said magnetic head comprising a pair of magnetic gaps having different azimuth angles;

said pair of magnetic gaps being displaced with respect to each other in said transverse direction by a distance that is substantially equal to said pitch distance, and being displaced with respect to each other in said scanning direction by a distance that is less than the sum of said step distance and said gap distance;

a leading one of said pair of magnetic gaps commencing scanning of said video signal region of a first track scanned by said leading one at a time that is after a time at which the other one of said pair of magnetic gaps has completed after-recording of an audio signal in the audio signal region of a second track that is adjacent to said first track, said first and second tracks being scanned substantially simultaneously by said pair of magnetic gaps.

12. In a digital video tape recorder that records video and audio signals on a magnetic tape by means of a digital recording magnetic head that moves relative to said tape in a scanning direction to form successive slant tracks thereon while the tape is advanced so that adjacent tracks are displaced with respect to each other in said scanning direction by a step distance and are displaced with respect to each other in a transverse direction perpendicular to the scanning direction by a pitch distance, each track having an audio signal region followed in said scanning direction by a video signal region, said audio signal region having a trailing end and said video signal region having a leading end, said leading end of said video signal region being displaced by a gap distance in said scanning direction with respect to said trailing end of said audio signal region; the combination of means for separating input digital video signals into data blocks each comprised of a plurality of picture element data, means for compression coding the data blocks, and means for channel-coding the compression-coded data and supplying the resulting channel-coded data to said digital recording magnetic head which comprises a pair of magnetic gaps having different azimuth angles;

said pair of magnetic gaps being displaced with respect to each other in said transverse direction by a distance that is substantially equal to said pitch distance, and being displaced with respect to each other in said scanning direction by a distance that is less than the sum of said step distance and said gap distance;

a leading one of said pair of magnetic gaps commencing scanning of said video signal region of a first track scanned by said leading one at a time that is after a time at which the other one of said pair of magnetic gaps has completed after-recording of an audio signal in the audio signal region of a second track that is adjacent to said first track, said first and second tracks being scanned substantially simultaneously by said pair of magnetic gaps.

13. A magnetic head for recording video and audio signals on a magnetic tape as said magnetic head moves relative to said tape in a scanning direction to form successive slant tracks thereon while the tape is advanced so that adjacent tracks are displaced with respect to each other in said scanning direction by a step distance and are displaced with respect to each other in a transverse direction perpendicular to the scanning direction by a pitch distance, so that, when used to record said video and audio signals, each track has a video signal region and an audio signal region which define therebetween an interblock gap, with said audio signal region of each track being disposed in a leading position with respect to said video signal region of said track; said magnetic head comprising:

a head base; and a pair of magnetic head chips disposed respectively at different azimuth angles on the head base and each having a respective magnetic gap;

said pair of magnetic head chips being displaced with respect to each other in said transverse direction by a distance that is substantially equal to said pitch distance, and the respective magnetic gaps being displaced with respect to each other in said scanning direction by a distance that is less than the sum of the length of said interblock gap and said step distance; and a leading one of said pair of magnetic head chips commencing scanning of said video signal region of a first track scanned by said leading one at a time that is after a time at which the other one of said pair of magnetic head chips has completed after-recording of an audio signal in the audio signal region of a second track that is adjacent to said first track, said first and second tracks being scanned substantially simultaneously by said pair of magnetic head chips.

14. A magnetic head for recording video and audio signals on a magnetic tape as said magnetic head moves relative to said tape in a scanning direction to form successive slant tracks thereon while the tape is advanced so that adjacent tracks are displaced with respect to each other in said scanning direction by a step distance and are displaced with respect to each other in a transverse direction perpendicular to the scanning direction by a pitch distance, so that, when used to record said video and audio signals, each track has a video signal region and an audio signal region which define therebetween an interblock gap; said video signal region of each track being disposed in a leading position with respect to said audio signal region of said track; said magnetic head comprising:

a head base; and a pair of magnetic head chips disposed respectively at different azimuth angles on the head base and each having a respective magnetic gap;

said pair of magnetic head chips being displaced with respect to each other in said transverse direction by a distance that is substantially equal to said pitch distance, and the respective magnetic gaps being displaced with respect to each other in said scanning direction by a distance that is less than the sum of the length of said interblock gap and said step distance; and a leading one of said pair of magnetic head chips commencing scanning of said audio signal region of a first track scanned by said leading one at a time that is after a time at which the other one of said pair of magnetic head chips has completed scanning of the video signal region of a second track that is adjacent to said first track, said first and second tracks being scanned substantially simultaneously by said pair of magnetic head chips.

15. A digital recording magnetic head for recording video and audio signals on a magnetic tape as said magnetic head moves relative to said tape in a scanning direction to form successive slant tracks thereon while the tape is advanced so that adjacent tracks are displaced with respect to each other in said scanning direction by a step distance and are displaced with respect to each other in a transverse direction perpendicular to the scanning direction by a pitch distance, so that, when used to record said video and audio signals, each track has a video signal region and an audio signal region which define therebetween an interblock gap; said audio signal region of each track being disposed in a leading position with respect to said video signal region of said track; and said video signals being in the form of blocks of picture element data that have been compression-coded and channel-coded; said magnetic head comprising:

a head base; and a pair of magnetic head chips disposed respectively at different azimuth angles on the head base and each having a respective magnetic gap;

said pair of magnetic head chips being displaced with respect to each other in said transverse direction by a distance that is substantially equal to said pitch distance, and the respective magnetic gaps being displaced with respect to each other in said scanning direction by a distance that is less than the sum of the length of said interblock gap and said step distance; and a leading one of said pair of magnetic head chips commencing scanning of said video signal region of a first track scanned by said leading one at a time that is after a time at which the other one of said pair of magnetic head chips has completed after-recording of an audio signal in the audio signal region of a second track that is adjacent to said first track, said first and second tracks being scanned substantially simultaneously by said pair of magnetic head chips.

16. A digital recording magnetic head for recording video and audio signals on a magnetic tape as said magnetic head moves relative to said tape in a scanning direction to form successive slant tracks thereon while the tape is advanced so that adjacent tracks are displaced with respect to each other in said scanning direction by a step distance and are displaced with respect to each other in a transverse direction perpendicular to the scanning direction by a pitch distance, so that, when used to record said video and audio signals, each track has a video signal region and an audio signal region which define therebetween an interblock gap; said video signal region of each track being disposed in a leading position with respect to said audio signal region of said track; and said video signals being in the form of blocks of picture element data that have been compression-coded and channel-coded, said magnetic head comprising:

a head base; and a pair of magnetic head chips disposed respectively at different azimuth angles on the head base and each having a respective magnetic gap;

said pair of magnetic head chips being displaced with respect to each other in said transverse direction by a distance that is substantially equal to said pitch distance, and the respective magnetic gaps being displaced with respect to each other in said scanning direction by a distance that is less than the sum of the length of said interblock gap and said step distance; and a leading one of said pair of magnetic head chips commencing scanning of said audio signal region of a first track scanned by said leading one at a time that is after a time at which the other one of said pair of magnetic head chips has completed scanning of the video signal region of a second track that is adjacent to said first track, said first and second tracks being scanned substantially simultaneously by said pair of magnetic head chips.

17. A magnetic head for recording video and audio signals on a magnetic tape as said magnetic head moves relative to said tape in a scanning direction to form successive slant tracks thereon while the tape is advanced so that adjacent tracks are displaced with respect to each other in said scanning direction by a step distance and are displaced with respect to each other in a transverse direction perpendicular to the scanning direction by a pitch distance, so that, when used to record said video and audio signals, each track has a video signal region and an audio signal region which define therebetween an interblock gap, said audio signal region of each track being disposed in a leading position with respect to said video signal region of said track; and said magnetic head comprising a pair of magnetic gaps having different azimuth angles;

said pair of magnetic gaps being displaced with respect to each other in said transverse direction by a distance that is substantially equal to said pitch distance, and being displaced with respect to each other in said scanning direction by a distance that is less than the sum of the length of said interblock gap and said step distance; and a leading one of said pair of magnetic gaps commencing scanning of said video signal region of a first track scanned by said leading one at a time that is after a time at which the other one of said pair of magnetic gaps has completed after-recording of an audio signal in the audio signal region of a second track that is adjacent to said first track, said first and second tracks being scanned substantially simultaneously by said pair of magnetic gaps.

18. A magnetic head for recording video and audio signals on a magnetic tape as said magnetic head moves relative to said tape in a scanning direction to form successive slant tracks thereon while the tape is advanced so that adjacent tracks are displaced with respect to each other in said scanning direction by a step distance and are displaced with respect to each other in a transverse direction perpendicular to the scanning direction by a pitch distance, so that, when used to record said video and audio signals, each track has a video signal region and an audio signal region which define therebetween an interblock gap, said video signal region of each track being disposed in a leading position with respect to said audio signal region of said track; said magnetic head comprising a pair of magnetic gaps having different azimuth angles;

said pair of magnetic gaps being displaced with respect to each other in said transverse direction by a distance that is substantially equal to said pitch distance, and being displaced with respect to each other in said scanning direction by a distance that is less than the sum of the length of said interblock gap and said step distance; and a leading one of said pair of magnetic gaps commencing scanning of said audio signal region of a first track scanned by said leading one at a time that is after a time at which the other one of said pair of magnetic gaps has completed scanning of the video signal region of a second track that is adjacent to said first track, said first and second tracks being scanned substantially simultaneously by said pair of magnetic gaps.

19. A digital recording magnetic head for recording video and audio signals on a magnetic tape as said magnetic head moves relative to said tape in a scanning direction to form successive slant tracks thereon while the tape is advanced so that adjacent tracks are displaced with respect to each other in said scanning direction by a step distance and are displaced with respect to each other in a transverse direction perpendicular to the scanning direction by a pitch distance, so that, when used to record said video and audio signals, each track has a video signal region and an audio signal region which define therebetween an interblock gap, said audio signal region of each track being disposed in a leading position with respect to said video signal region of said track; and said video signals being in the form of blocks of picture element data that have been compression-coded and channel-coded;

said magnetic head comprising a pair of magnetic gaps having different azimuth angles;

said pair of magnetic gaps being displaced with respect to each other in said transverse direction by a distance that is substantially equal to said pitch distance, and being displaced with respect to each other in said scanning direction by a distance that is less than the sum of the length of said interblock gap and said step distance; and a leading one of said pair of magnetic gaps commencing scanning of said video signal region of a first track scanned by said leading one at a time that is after a time at which the other one of said pair of magnetic gaps has completed after-recording of an audio signal in the audio signal region of a second track that is adjacent to said first track, said first and second tracks being scanned substantially simultaneously by said pair of magnetic gaps.

20. A digital recording magnetic head for recording video and audio signals on a magnetic tape as said magnetic head moves relative to said tape in a scanning direction to form successive slant tracks thereon while the tape is advanced so that adjacent tracks are displaced with respect to each other in said scanning direction by a step distance and are displaced with respect to each other in a transverse direction perpendicular to the scanning direction by a pitch distance, so that, when used to record said video and audio signals, each track has a video signal region and an audio signal region which define therebetween an interblock gap, said video signal region of each track being disposed in a leading position with respect to said audio signal region of said track; and said video signals being in the form of blocks of picture element data that have been compression-coded and channel-coded;

said magnetic head comprising a pair of magnetic gaps having different azimuth angles;

said pair of magnetic gaps being displaced with respect to each other in said transverse direction by a distance that is substantially equal to said pitch distance, and being displaced with respect to each other in said scanning direction by a distance that is less than the sum of the length of said interblock gap and said step distance; and a leading one of said pair of magnetic gaps commencing scanning of said audio signal region of a first track scanned by said leading one at a time that is after a time at which the other one of said pair of magnetic gaps has completed scanning of the video signal region of a second track that is adjacent to said first track, said first and second tracks being scanned substantially simultaneously by said pair of magnetic gaps.

* * * * *